US006762766B1

(12) United States Patent
Nakayama

(10) Patent No.: US 6,762,766 B1
(45) Date of Patent: Jul. 13, 2004

(54) IMAGE PROCESSING COMPUTER SYSTEM FOR PHOTOGRAMMETRIC ANALYTICAL MEASUREMENT

(75) Inventor: Toshihiro Nakayama, Saitama (JP)

(73) Assignee: PENTAX Corporation, Tokyo (JP)

( * ) Notice: Subject to any disclaimer, the term of this patent is extended or adjusted under 35 U.S.C. 154(b) by 319 days.

(21) Appl. No.: 09/610,948

(22) Filed: Jul. 6, 2000

(30) Foreign Application Priority Data

Jul. 6, 1999 (JP) .......................................... 11-191839

(51) Int. Cl.[7] .............................................. G09G 5/00
(52) U.S. Cl. ....................... 345/581; 345/723; 345/724; 345/792; 348/143; 348/333.05; 348/159; 348/211.4; 348/211.8; 348/211.13; 348/211.11; 348/333.01; 382/154; 382/284
(58) Field of Search ................................. 345/723, 724, 345/792; 348/143, 159, 211.99, 211.4, 211.8, 211.11, 211.13, 333.01, 333.05

(56) References Cited

U.S. PATENT DOCUMENTS

| 5,138,460 | A | * | 8/1992 | Egawa ........................ 348/239 |
| 5,699,444 | A | | 12/1997 | Palm |
| 5,943,050 | A | * | 8/1999 | Bullock et al. ............. 345/783 |
| 5,995,765 | A | | 11/1999 | Kaneko et al. |
| 6,108,497 | A | | 8/2000 | Nakayama et al. |
| 6,304,669 | B1 | * | 10/2001 | Kaneko et al. ............. 382/154 |
| 6,321,024 | B1 | * | 11/2001 | Fujita et al. .................. 386/55 |
| 6,437,811 | B1 | * | 8/2002 | Battles et al. ............... 345/835 |
| 2001/0000126 | A1 | * | 4/2001 | Kinjo |
| 2002/0024608 | A1 | * | 2/2002 | Ejima et al. |

FOREIGN PATENT DOCUMENTS

| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10253875 | 9/1998 |
| JP | 10293026 | 11/1998 |
| JP | 10307025 | 11/1998 |
| JP | 11295065 | 10/1999 |

OTHER PUBLICATIONS

Elaine Weinmann, Peter Lourekas,Photoshop 5.0 for Windows and Macintosh, 1998, Paechpit Press, 10,12,19,195, 203–208,234,279.*
User Guide, Adobe Photoshop 5.0, 1998, Adobe Systems Inc. 239–255,271–279.*
Elaine Weinmann, Peter Lourekas,Photoshop 5.0 for Windows and Macintosh, 1998, Paechpit Press.*
User Guide, Adobe Photoshop 5.0, 1998, Adobe Systems Inc.*
English Language Abstract of JP 10–307025.
English Language Abstract of JP 10–221072.
English Language Abstract of JP 10–185563.
English Language Abstract of JP 10–185562.
English Language Abstract of JP 10–170263.
English Language Abstract of JP 10–141951.
English Language Abstract of JP 11–295065.

* cited by examiner

Primary Examiner—Matthew C. Bella
Assistant Examiner—Manucher Rahmjoo
(74) Attorney, Agent, or Firm—Greenblum & Bernstein, P.L.C.

(57) ABSTRACT

In an image processing computer system for a photogrammetric analytical measurement in which a survey map is formed by successively connecting survey map sections to each other, each survey map section is produced based on a set of pictures photographed for the measurement. Plural frames of image data are read from a memory in a predetermined order. A monitor displays a scene including a first display area and a second display area. Respective plural pictures are displayed on first display area based on the plural frames of image data read from the memory. A displayed picture can be optionally transferred from the first display area to the second display area. The transferred picture can be optionally returned to the first display area. The pictures displayed on the first display area are rearranged by the transfer of pictures between the first and second display areas such that pictures forming each set for producing a survey map section are capable of being visually recognized.

11 Claims, 17 Drawing Sheets

IMAGE PROCESSING COMPUTER SYSTEM FOR PHOTOGRAMMETRIC ANALYTICAL MEASUREMENT

BACKGROUND OF THE INVENTION

1. Field of the Invention

The present invention relates to an image-processing computer system for a photogrammetric analytical measurement, in which a survey map is electronically produced based on a pair of photographed pictures obtained at two different photographing positions.

2. Description of the Related Art

For example, photogrammetry is carried out at a traffic accident spot. The traffic accident spot is photographed by an electronic still video digital camera in at least two different positions, and a survey map of the traffic accident spot is produced based on a pair of photographed pictures obtained at the different positions, as disclosed in, for example, Unexamined Japanese Patent Publications No.10-221072 and No.10-293026.

Before accurately scaled distances and lengths can be reproduced on the survey map, a standard measurement scale or target must be recorded together with the photographed objects in the pictures. The target is disclosed in, for example, Unexamined Japanese Patent Publications No.10-141951, No.10-170263, No.10-185562, No.10-185563, No.10-293026, No.10-307025 and No.11-295065.

For the production of the survey map, a two-dimensional coordinate system is defined on each of the pictures, and two-dimensional positions of the objects, which are recorded on each picture, are determined by the two-dimensional coordinate system. Also, a three-dimensional coordinate system is defined on the target, and three-dimensional positions of the recorded objects are determined based on the two-dimensional positions of the objects with respect to the three-dimensional coordinate system. Accordingly, it is possible to produce a survey map by projecting the three-dimensional coordinates, representing the objects, on one of the three planes defined by the three-dimensional system. Of course, the production of the survey map is performed using an image-producing computer system.

For example, to produce a long portion of a roadway as a survey map, it is necessary to obtain plural pairs of pictures to cover the length of the roadway, and the target must be moved from one position to another position in the length of the roadway. In this case, a survey map section is produced based on each pair of pictures, and the survey map is obtained by successively connecting the survey map sections to each other.

Preferably, a series of photographing operations for the photogrammetric analytical measurement should be orderly performed, so that a pair of pictures for producing a survey map section can be more easily selected and recognized from among plural pictures obtained by the series of photographing operations.

Nevertheless, during a performance of the series of photographing operations for the measurement, an additional photographing operation may be frequently performed to photograph and record, for example, evidence or circumstances concerning an traffic accident, regardless of the measurement. Of course, the intervention of the additional photographing operation results in a disturbance of a proper order of the photographing operations for the measurement.

Further, in reality, the photographing operations for the measurement may be disorderedly performed for various reasons.

In this case, of course, it is necessary to rearrange the pictures for the measurement, before each pair of pictures for producing a survey map section can be efficiently and easily fixed.

SUMMARY OF THE INVENTION

Therefore, an object of this invention is to provide an image processing computer system for a photogrammetric analytical measurement, which is constituted such that plural pictures for the measurement can be easily and efficiently rearranged to facilitate a fixing of a pair of pictures for producing a survey map section.

In accordance with an aspect of the present invention, there is provided an image processing computer system for a photogrammetric analytical measurement in which a survey map is formed by successively connecting survey map sections to each other, each of the survey map section being produced based on a set of pictures photographed for the measurement. The image processing computer system comprises a memory for storing plural frames of image data, an image-data-reading controller for reading the plural frames of image data from the memory in a predetermined order, a monitor for displaying a scene including a picture-arranging-display area and a picture-shunting-display area, a first monitor controller for displaying respective plural pictures on the picture-arranging-display area on the basis of the plural frames of image data read from the memory by the image-data-reading controller, a second monitor controller for transferring a displayed picture from the picture-arranging-display area to the picture-shunting-display area, and a third monitor controller that returns the transferred picture to the picture-arranging-display area. The pictures, displayed on the picture-arranging-display area, are rearranged using the second and third monitor controllers, such that pictures forming each set for producing a survey map section are capable of being visually recognized.

Preferably, a display of pictures on the picture-arranging-display area and the picture-shunting-display area is performed at a reduced size.

Preferably, the plural pictures are displayed on the picture-arranging-display area to form a pair of columns under control of the first monitor controller, and the pictures forming such set for producing the survey map section are displayed side by side in the pair of columns after the rearrangement of pictures by the second and third monitor controllers.

The second monitor controller may be provided for transferring a picture, having no relation to the measurement, from the picture-arranging-display area to the picture-shunting-display area. In this case, preferably, the image processing computer system further comprises an indicator for indicating a picture to be transferred from the picture-arranging-display area to the picture-shunting-display area, and a display controller for reversing the indicated picture to a negative picture.

The third monitor controller may be provided for returning the transferred picture to the picture-arranging-display at a given location. In this case, preferably the image processing computer system further comprises a first indicator for indicating a picture to be returned from the picture-shunting-display area to the picture-arranging-display area, a first display controller for reversing the picture, indicated by the first indicator, to a negative picture, a second indicator for indicating a picture on the picture-arranging-display area, a location of which the picture indicated by the first indicator is to be returned to, and a second display controller that reverses the picture, indicated by the second indicator, to a negative picture.

Also, the third monitor controller may be provided for returning the transferred picture to the picture-arranging-display at a last location. In this case, preferably, the image processing computer system further comprises an indicator for indicating a picture to be returned from the picture-shunting-display area to the picture-arranging-display area at the last location thereof, and a display controller for reversing the picture, indicated by the first indicator, to a negative picture.

In accordance with another aspect of the present invention, there is provided an image processing method for a photogrammetric analytical measurement in which a survey map is formed by successively connecting survey map sections to each other, each of the survey map sections being produced based on a set of pictures photographed for the measurement. The image processing method comprises the steps of: storing plural frames of image data in a memory; reading the plural frames of image data from the memory in a predetermined order under control of an image-data-reading controller; displaying a scene on a monitor including a picture-arranging-display area and a picture-shunting-display area; displaying respective plural pictures of the picture-arranging-display area on the basis of the plural frames of image data, read from the memory by the image-data-reading controller, under control of a first monitor controller; transferring a displayed picture from the picture-arranging display area to the picture-shunting-display area under control of a second monitor controller; and returning the transferred picture to the picture-arranging-display area under control of a third monitor controller. The pictures displayed on the picture-arranging-display area are rearranged using the second and third monitor controller such that pictures forming each set for producing a survey map section are capable of being visually recognized.

In accordance with yet another aspect of the present invention, there is provided a memory medium storing an image processing program for executing the above-mentioned method.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
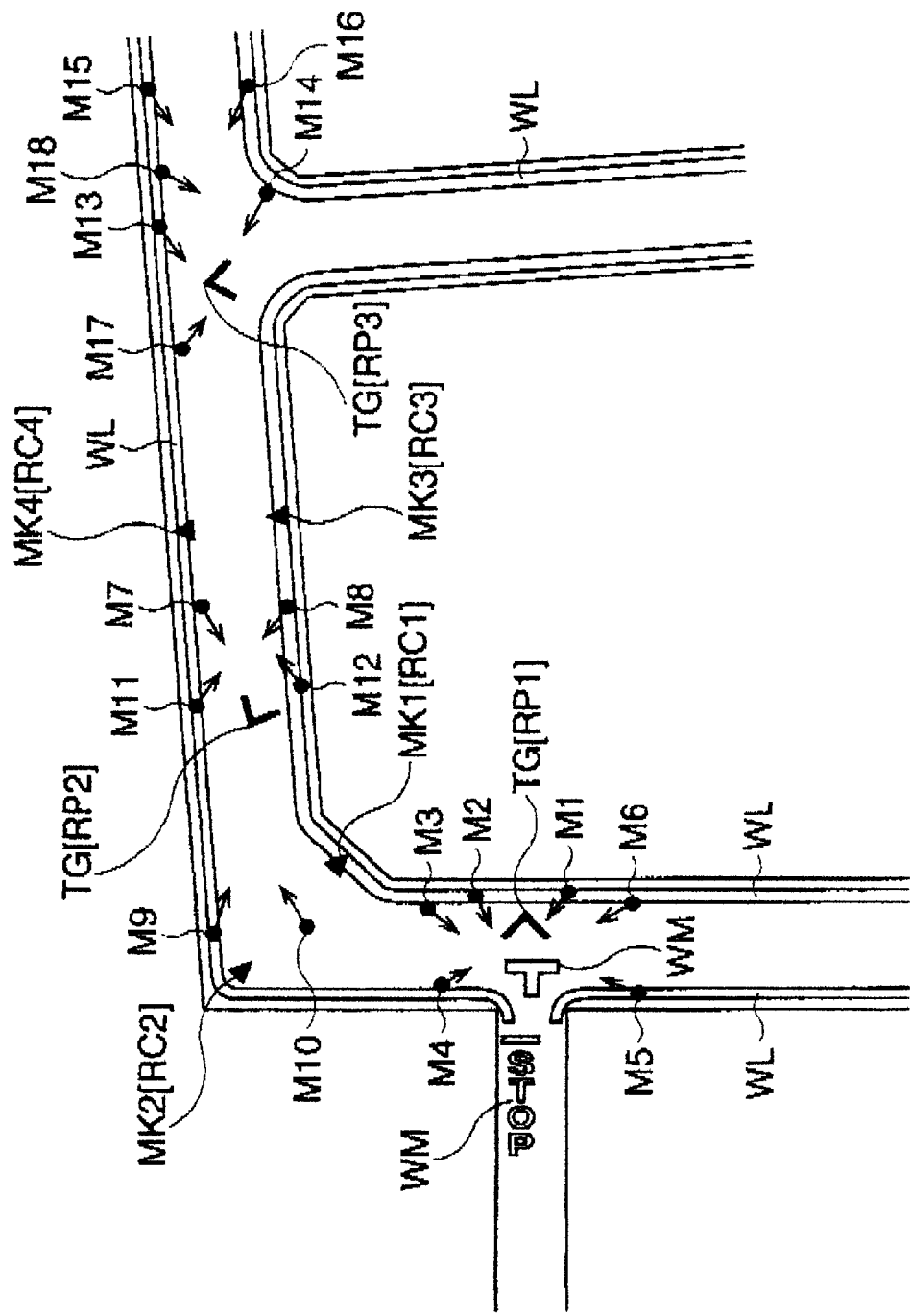
FIG. 1 is a plan view of a roadway for explaining a photogrammetric analytical measurement, which is utilized by a photogrammetric image processing computer system according to the present invention.

With reference to FIG. 1, a roadway is shown as a plan view, by way of example, for explaining a photogrammetric analytical measurement which utilizes a photogrammetric image processing computer system of the present invention. In this example, the roadway is photographed by an electronic still video digital camera 50 (FIG. 4) at eighteen photographing positions, which are represented by small solid circles indicated by references M1 to M18, respectively. Each of the eighteen pictures, photographed at the photographing positions M1 to M18, is processed by a control circuit of the digital camera 50, and is then stored as a frame of image data in a memory medium, such as an IC memory card, held in the camera 50. The memory card is loaded in the photogrammetric image processing computer system according to the present invention, and a survey map of the roadway is produced on the basis of the eighteen frames of image data read from the memory card, as stated in detail hereinafter.

Each of the photographing positions M1 to M18 is defined as a back principal point M (FIG. 4) of a photographing optical lens system of the digital camera 50. As shown in FIG. 1, an arrow is projected from each of the photographing positions M1 to M18 to indicate a photographing direction at the corresponding photographing position (M1, M2, . . . M17, M18). The photographing direction is defined as an orientation of an optical axis of the photographing optical lens system of the digital camera 50.

The eighteen photographing operations are performed in the order of the photographing positions M1 to M18. Also, when each of the photographing operations is performed, an object to be surveyed is photographed together with a target, indicated by reference TG (FIG. 4), which serves as a standard measurement scale. In FIG. 1, although three targets TG are shown, only one target TG is used. Respective bracketed references RP1, RP2 and RP3, appended to the references TG, represents target positions at which the target TG is to be located.

In the example of FIG. 1, the target TG is initially located at the first target positions RP1, and the first, second, third, fourth, fifth and sixth photographing operations are performed at the positions M1 to M6. After the completion of the sixth photographing operation, the target TG is moved from the first target position RP1 to the second target position RP2, and the seventh, eight, ninth and tenth photographing operations are performed at the positions M7 to M10. After the completion of the tenth photographing operation, the target TG is further moved from the second target position RP2 to the third target position RP3, and the eleventh, twelfth, thirteenth, fourteenth, fifteenth, sixteenth, seventeenth and eighteenth photographing operations are performed at the positions M11 to M18.

The target TG is provided with a movement sensor for detecting the movement of the target TG, as disclosed in Unexamined Japanese Patent Publication No. 11-295065, and a tilt-angle sensor for detecting a tilt-angle of the target TG, as disclosed in Unexamined Japanese Patent Publication No. 10-185563. Whenever the target TG is moved from one position to another position, the movement sensor detects a movement of the target between the two positions, and outputs a signal representing the movement of the target TG. The tilt-angle sensor detects a tilt-angle of the target TG to a horizontal plane when being located on the roadway, and outputs a tilt-angle signal representing the detected tilt-angle.

The target TG is further provided with a signal processor for processing the respective signals output from the movement sensor and the tilt-angle sensor, and a radio transmitter for transmitting the processed signals to a receiver provided in the camera 50. The transmission of the signals from the radio transmitter is repeated at regular intervals of very short time. Whenever a photographing operation is performed by the camera 50, and the transmitted signals are retrieved from the receiver by the control circuit of the camera 50. The retrieved signals are processed by the control circuit of the camera 50, and are then stored in the memory card, together with a corresponding frame of image data obtained by the photographing operation.

An object to be surveyed is twice photographed by the camera 50 at two different photographing positions and in two different photographing directions. Namely, the two photographing operations are consecutively performed by the camera 50 with respect to the object to be surveyed, and a pair of pictures, on which the object to be surveyed is recorded, is obtained by the two consecutive photographing operations.

In particular, while the target TG is located at the first target position RP1, a first pair of pictures is obtained by the consecutive first and second photographing operations at the positions M1 and M2, a second pair of pictures is obtained by the consecutive third and fourth photographing operations at the positions M3 and M4, and a third pair of pictures is obtained by the consecutive fifth and sixth photographing operations M5 and M6. The first, second and third pairs of pictures form a first group of pictures featuring the first target position RP1 of the target TG.

Also, while the target TG is located at the second target positions RP2, a fourth pair of pictures is obtained by the consecutive seventh and eighth photographing operations at the positions M7 and M8, and a fifth pair of pictures is obtained by the consecutive ninth and tenth photographing operations at the positions M9 and M10. The fourth and fifth pairs of pictures form a second group of pictures featuring the second target positions RP2 of the target TG.

Further, while the target TG is located at the third target position RP3, a sixth pair of pictures is obtained by the consecutive eleventh and twelfth photographing operations at the positions M11 and M12, a seventh pair of pictures is obtained by the consecutive thirteenth and fourteenth photographing operations at the positions M13 and M14, an eighth pair of pictures is obtained by the consecutive fifteenth and sixteenth photographing operations M15 and M16, and a ninth pair of pictures is obtained by the consecutive seventeenth and eighteenth photographing operations at the positions M17 and M18. The sixth, seventh, eighth and ninth pairs of pictures form a third group of pictures featuring the third target position RP3 of the target TG.

In order for the production of the survey map of the roadway, nine survey map sections are produced on the basis of the first, second, third, fourth, fifth, sixth, seventh, eighth and ninth pairs of pictures, respectively, and then are successively connected to each other.

For the connection between one of the first, second and third survey map sections, derived from the first group of pictures, and one of the fourth and fifth survey map sections, derived from the second group of pictures, a first set of markers MK1 and MK2 is located between the first and second target positions RP1 and RP2, and the first set of markers MK1 and MK2 is photographed in at least one pair of pictures, included in the first group of pictures, and in at least one pair of pictures, included in the second group of pictures.

Similarly, for the connection between one of the fourth and fifth survey map sections, derived from the second group of pictures, and one of the sixth, seventh, eighth and ninth survey map sections, derived from the third group of pictures, a second set of markers MK3 and MK4 is located between the second and third target positions RP2 and RP3, and the second set of markers MK3 and MK4 is photographed in at least one pair of pictures, included in the second group of pictures, and in at least one pair of pictures, included in the third group of pictures.

In FIG. 1, respective bracketed references RC1 and RC2, appended to the references MK1 and MK2, represent connection points for connecting two survey map sections derived from the first and second groups of pictures.

Similarly, respective bracketed references RC3 and RC4, appended to the references MK3 and MK4, represent connection points for connecting two survey map sections derived from the second and third groups of pictures.

In FIG. 1, although each of the markers MK1, MK2, MK3 and MK4 is shown as a small solid triangle, it may comprise a cone-shaped marker. In this case, the connection point (RC1, RC2, RC3, RC4) is represented by an apex of the cone-shaped marker.

In the example of FIG. 1, a single set of markers may be used for the two sets of markers, (MK1 and MK2; MK3 and MK4). Of course, in this case, the single set of markers are initially located between the first and second target positions RP1 and RP2, and is then moved to a location between the second and third target positions RP2 and RP3 after the photographing operations for the second group of pictures are completed.

Note, in FIG. 1, references WL indicate white lines painted along the sides of the roadway, and references WM indicate white traffic symbols pointed on the roadway.

Figure 2:
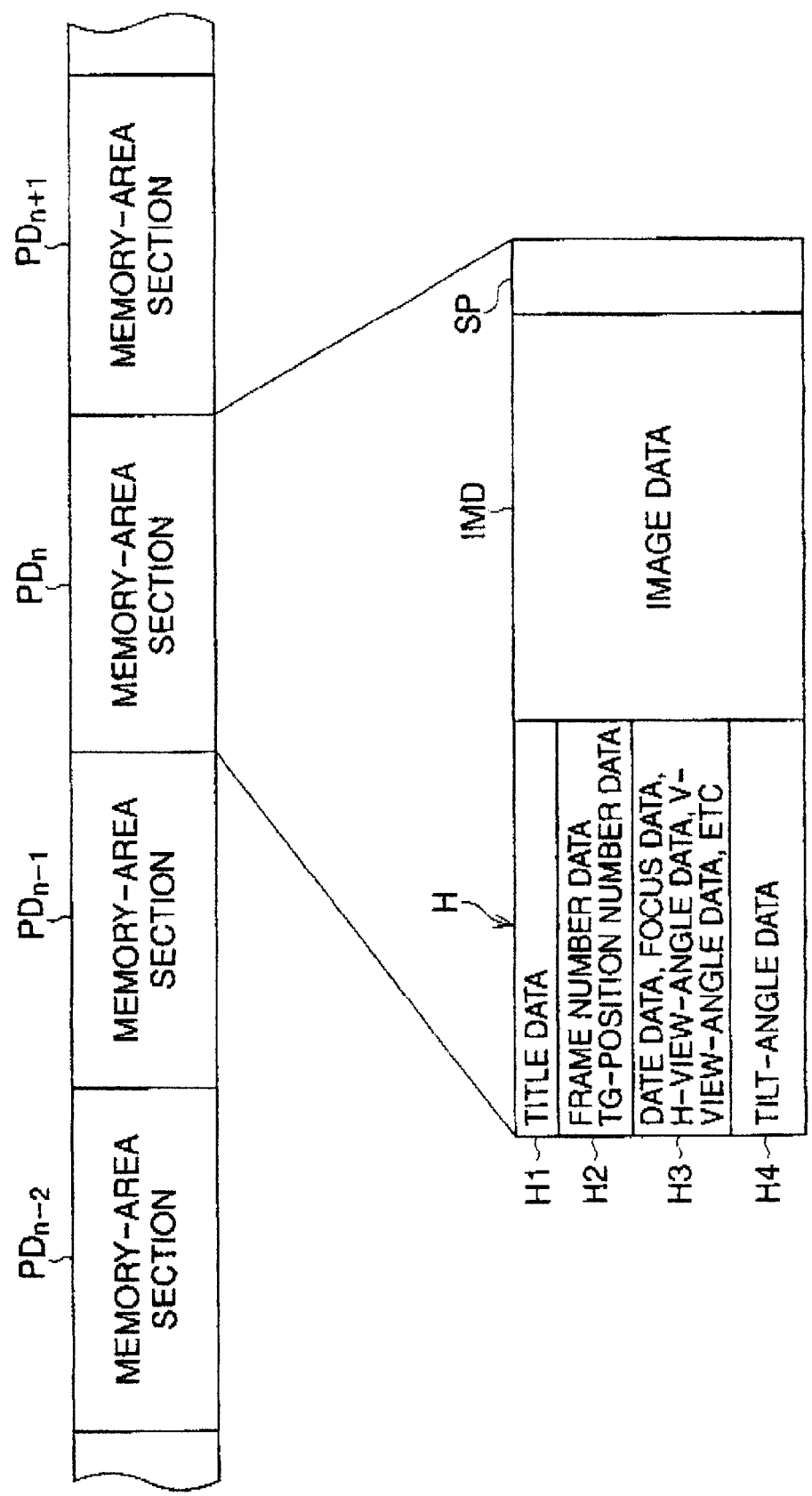
FIG. 2 is a conceptual schematic view showing an example of a format of a memory card, which is detachably held in an electronic still video digital camera utilized in the photogrammetric analytical measurement, and which is loaded in the photogrammetric image processing computer system according to the present invention.

FIG. 2 conceptually shows a format of the IC memory card held in the camera 50. As shown in this drawing, a memory-area of the memory card is sectioned into a plurality of memory-area sections, some of which are indicated by references $PD_{n-2}$, $PD_{n-1}$, $PD_n$ and $PD_{n+1}$, and each of the memory-area sections ($\ldots$, $PD_{n-2}$, $PD_{n-1}$, $PD_n$ and $PD_{n+1}$, $\ldots$) includes an image area IMD, a header area H and a margin area SP. Of course, the image area IMD is provided for storing a frame of image data representing a photographed picture. The header area H is sectioned into subheader areas H1, H2, H3 and H4 for storing various particular data concerning the photographed picture. The margin area SP is provided for distinguishing between the two adjacent memory-area sections $PD_n$ and $PD_{n+1}$.

The subheader areas H1 is provided for storing a title data of the photographed picture, and the title data is input by manipulating character-inputting-switch buttons provided on a camera body of the camera 50, if necessary.

The subheader area H2 is provided for storing two kinds of number data: a frame number data representing a photographing order and a target-position number data representing a target-position (RP1, RP2, RP3) of the target TG.

For the frame number data, a frame number counter is defined in the control circuit of the camera 50, and, for example, is initially set to be "0". Whenever a photographing operation is performed by the camera 50, the frame number counter is incremented by "1", and is stored as the frame number data in a corresponding subheader area H2. For example, when the first photographing operation is completed at the position M1, the frame number data is stored as "1" in the subheader area H2 of the first memory-area section $PD_1$, and when the eighteenth photographing operation is completed at the position M18, the frame number data is stored as "18" in the subheader area H2 of the eighteenth memory-area section $PD_{18}$.

For the target-position number data, a target-position-number counter is defined in the control circuit of the camera 50, and, for example, is initially set to be "1". Whenever a movement of the target TG from one position to another position is confirmed by detecting the movement-signal transmitted from the radio transmitter of the target TG, the target-position-number counter is incremented by "1", and, whenever a photographing operation is completed by the camera 50, a count number data of the target-position-number counter is stored as the target-position number data in a corresponding subheader area H2. Thus, when each of the first, second, third, fourth, fifth and sixth photographing operations is completed, the target-position number data is stored as "1" in the subheader area H2 of each memory-area section ($PD_1$, $\ldots$, $PD_6$). Also, when each of the seventh, eighth, ninth and tenth photographing operations is completed, the target-position number data is stored as "2" in the subheader area H2 of each memory-area section ($PD_7$, $\ldots$, $PD_{10}$). Further, when each of the eleventh, twelfth, thirteenth, fourteenth, fifteenth, sixteenth, seventeenth and eighteenth photographing operations is completed, the target-position number data is stored as "3" in the subheader area H2 of each memory-area section ($PD_{11}$, $\ldots$, $PD_{18}$).

In short, the photographed pictures, included in the first group, are featured by "1" as the target-position number data; the photographed pictures, included in the second group, are featured by "2" as the target-position number data; and the photographed pictures, included in the third group, are featured by "3" as the target-position number data.

The subheader area H3 is provided for storing a photographing date data, a focus-distance data, a horizontal view-angle data, a vertical view-angle data, a resolving-power data of a CCD (charge-coupled device) image sensor, used in the camera 50, and so on. These data are automatically stored in the subheader area H3 by the control circuit of the camera 50 whenever a photographing operation is completed.

The subheader area H4 is provided for storing the tilt-angle data of the target TG, which are derived from a tilt-angle signal transmitted from the radio transmitter of the target TG. Namely, whenever a photographing operation is performed by the camera 50, the tilt-angle signal is retrieved from the receiver by the control circuit of the camera 50, and the retrieved signal is processed by the control circuit of the camera 50, thereby producing the tilt-angle data to be stored in the subheader H4.

Figure 3:
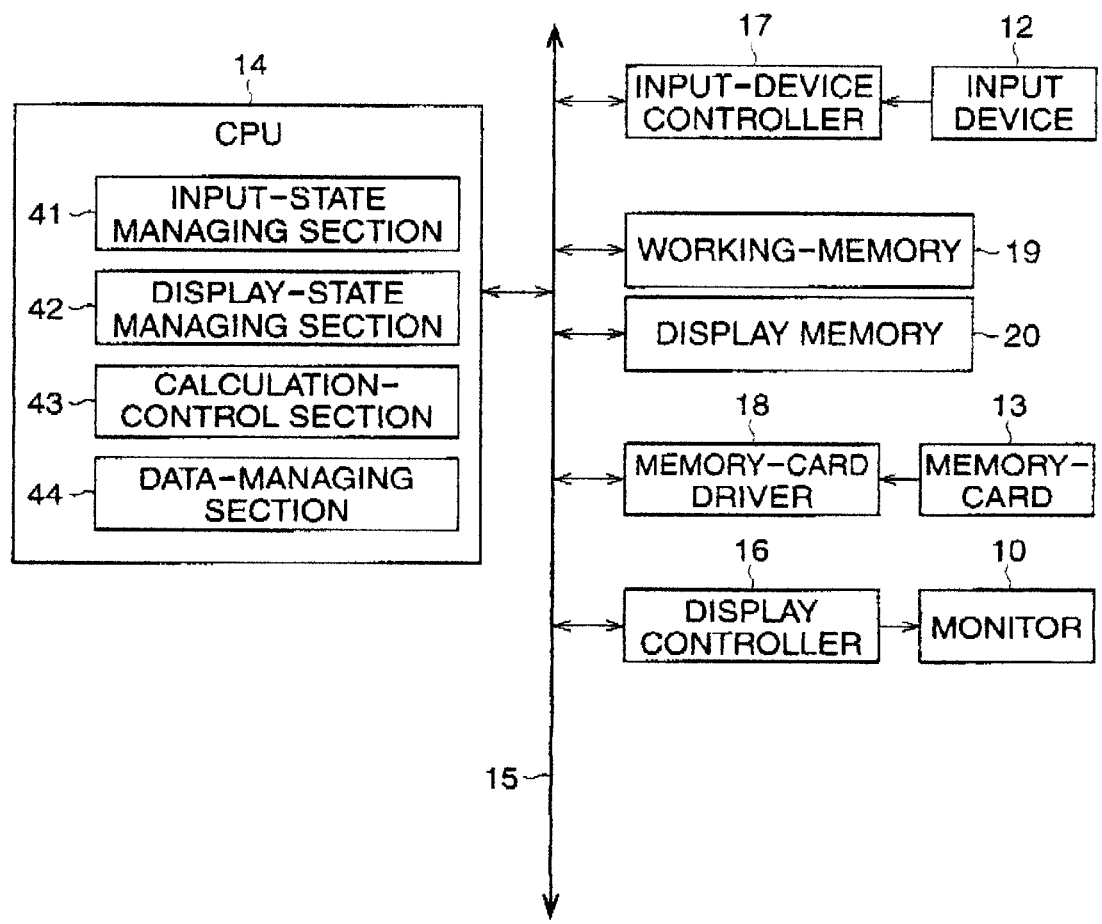
FIG. 3 is a block diagram of the photogrammetric image processing computer system according to the present invention.

With reference to FIG. 3, the photogrammetric image processing computer system according to the present invention is shown as a block diagram.

The image processing computer system comprises: a central processing unit (CPU) 14; a display device 10, such as a CRT monitor; a display controller 16 for controlling the monitor 10; a display memory 20 for storing image data on which a scene to be displayed on the monitor 10 is based; an input device 12 including a keyboard and a mouse; an input-device controller 17 for controlling the input device 12; a memory-card driver 18 for loading the memory card, indicated by reference 13; and a working memory 19 used as a cash memory when executing calculations and processings in the CPU 14. The input-device controller 17, the working memory 19, the display memory 20, the memory-card driver 18 and the display controller 16 are connected to the CPU 14 via a bus 15.

As conceptually shown in FIG. 3, the CPU 14 includes an input-state managing section 41, a display-state managing section 42, a calculation-control section 43, and a data-managing section 44.

The input-state managing section 41 manages various information data and command data input through the input device 12. For example, when a cursor or pointer is moved on a scene of the monitor 10 by manipulating the mouse of the input device 12, the movement of the pointer is managed by the input-state managing section 41. Also, by the input-state managing section 41, it is monitored whether character code data is input through the keyboard of the input device 12, and, when the character code data is input, the character code data is converted into character image data, which is output to the display memory 20, whereby character images are displayed on the scene of the monitor 10.

The display-state managing section 42 manages a scene to be displayed on the monitor 10. For example, when at least a part of the scene displayed on the monitor 10 is changed, the change of the scene is managed by the display-state managing section. Namely, writing of image data in the display memory 20 is controlled by the display-state managing section 42, thereby changing the scene displayed on the monitor 10. The display controller 16 repeatedly reads the image data from the display memory 20 at a regular interval of given short time, and converts the read image data into a three primary (red, green and blue) video data.

The calculation-control section 43 executes various calculations, thereby producing a survey map of the roadway, as stated in detail hereinafter.

The data-managing section 44 manages various data read from the memory card 13 through the memory-card driver 18, survey map data, various data necessary for producing the survey map data and so on.

After the eighteen photographing operations are completed by the camera 50 at the photographing positions M1 to M18, as shown in FIG. 1, the memory card 13 is removed from the camera 50, and is then loaded in the memory-card driver 18. Of course, the loaded memory card 13 stores the eighteen frames of image data obtained by the eighteen photographing operations performed at the positions M1 and M18.

The eighteen frames of image data are read from the memory card 13 through the memory-card driver 18, and are once stored in the working-memory 19. Then, each of the eighteen photographing positions M1, M2, . . . , M17 and M18 is spatially determined with respect to the target TG on the basis of the corresponding frame of image data.

Figure 4:
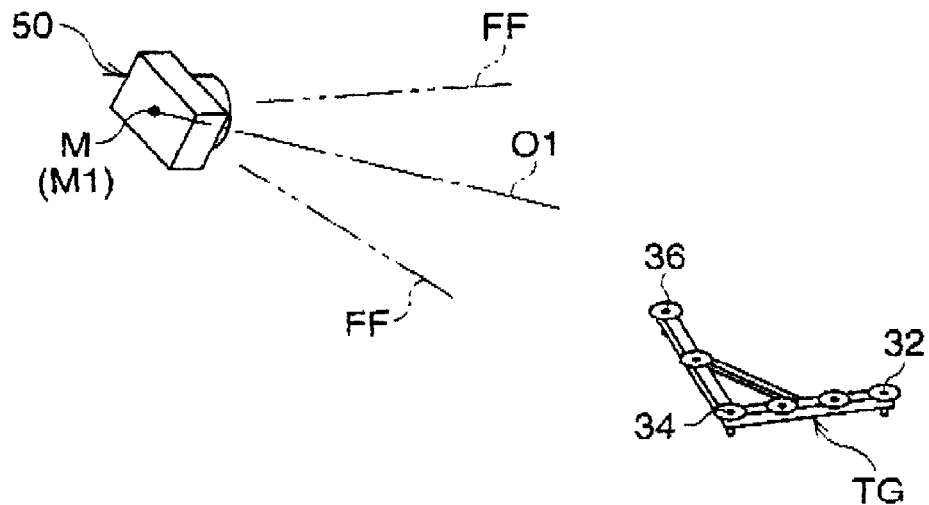
FIG. 4 shows a conceptual perspective view showing a positional relationship between the camera and a target when performing a photographing operation at a first photographing position.
Figure 5:
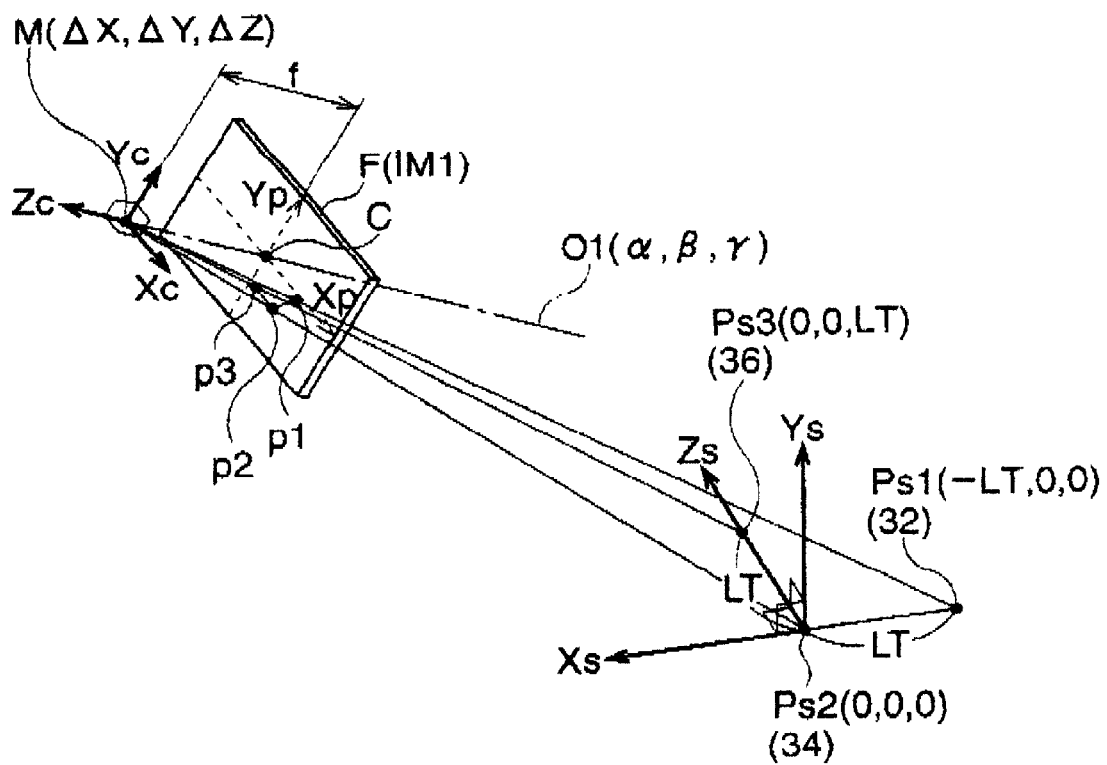
FIG. 5 is a geometrical and conceptual illustration of the positional relationship shown in FIG. 4.
Figure 6:
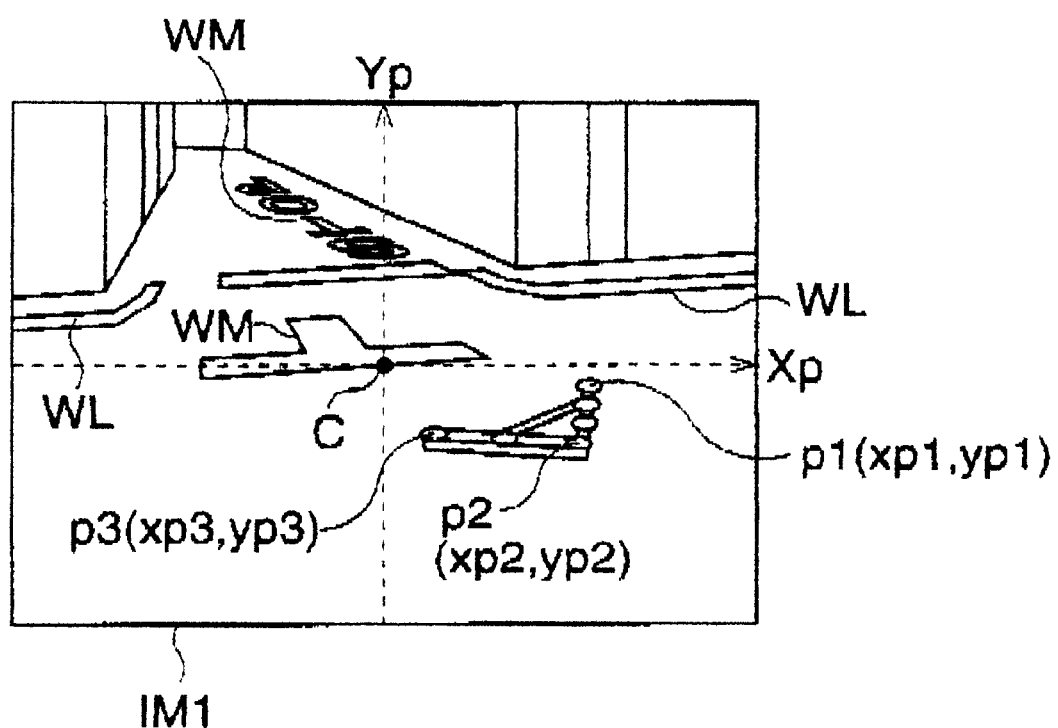
FIG. 6 is an actual view of a picture photographed at the first photographing position shown in FIG. 4.

Referring to FIGS. 4 to 6, the spatial determination of the first photographing position M1 with respect to the target TG will be representatively explained.

FIG. 4 shows a positional relationship between the camera 50 and the target TG when performing the photographing operation at the first photographing position M1. In the positional relationship of FIG. 4, of course, the target TG is within a view-angle defined by the photographing lens system of the camera 50, boundaries of the view-angle being indicated by reference FF. Also, the optical axis of the photographing lens system of the camera 50 is indicated by reference O1. As stated hereinbefore, the first photographing position M1 is defined as the back principal point M of the photographing optical lens system of the camera 50. As is apparent from FIG. 4, the target TG has an L-shaped configuration, and is provided with reference points 32, 34 and 36. A line segment between the reference points 32 and 34 is perpendicular to a line segment between the reference points 34 and 36, and both the line segments have a same length.

Referring to FIG. 5, the positional relationship of FIG. 4 is geometrically and conceptually illustrated. In this drawing, reference F indicates an image plane defined by the photographing optical lens system of the camera 50, and the picture formed on the image plane F is indicated by reference IM1. The picture IM1, of course, corresponds to the first picture photographed at the position M1 (FIG. 1), and is actually shown in FIG. 6.

As shown in FIG. 5, the optical axis O1 passes through a center C of the image plane F or picture IM1, and a distance between the center C and the back principal point M (M1) is defined as a focal distance f. A three-dimensional $X_S$-$Y_S$-$Z_S$ coordinate system is defined on the target TG located at the first target position RP1, as shown in FIG. 5. Namely, the origin of the $X_S$-$Y_S$-$Z_S$ coordinate system is at the reference point 34 of the target TG, the $X_S$-axis coincides with the line segment between the reference points 32 and 35, and the $Z_S$-axis coincides with the line segment between the reference points 34 and 36. Of course, the $Y_S$-axis is perpendicular to both the $X_S$- and $Z_S$-axes. Note, the $X_S$-$Y_S$-$Z_S$ coordinate system, defined on the target TG located at the first target position RP1, is referred to as a first scene coordinate system hereinafter.

The survey map is produced by projecting three-dimensional coordinates representing an image point on a plane defined by the $X_S$- and $Z_S$-axes of the first scene coordinate system ($X_S$-$Y_S$-$Z_S$), and the plane concerned must be horizontal before the production of the survey map can be properly performed. Nevertheless, the target TG cannot necessarily be horizontally positioned on the roadway when being located at the first target position RP1. Thus, if the target TG is tilted with respect to a horizontal plane, the plane concerned is also tilted. The tilt of the target TG is corrected on the basis of the tilt-angle data, which is derived from the tilt-angle signal transmitted from the radio transmitter of the target TG. Accordingly, although the target TG is tilted, it is possible to properly perform the definition of the first scene coordinate system ($X_S$-$Y_S$-$Z_S$).

In FIG. 5, a distance between the reference points 32 and 34 is represented by reference LT, and thus a distance between the reference points 34 and 36 can be represented by the same reference LT, because the respective line segments between the reference points 32 and 34 and between the reference points 34 and 36 have the same length, as mentioned above. Accordingly, as shown in FIG. 5, the reference point 32 is represented by the coordinates $P_{S1}$(-LT, 0, 0), the reference point 34 is represented by the origin coordinates $P_{S2}$(0, 0, 0) and the reference point 36 is represented by the coordinates $P_{S3}$(0, 0, LT).

The back principal point M (M1) is determined with respect to the first scene coordinate system ($X_S$-$Y_S$-$Z_S$). To this end, a two-dimensional $X_P$-$Y_P$ coordinate system is defined on the image plane F or first picture IM1, as shown in FIGS. 5 and 6, and a camera coordinate system or three-dimensional $X_C$-$Y_C$-$Z_C$ coordinate system is defined on the camera 50, as shown in FIG. 5.

As best shown in FIG. 6, the origin of the $X_P$-$Y_P$ coordinate system coincides with the center C of the image plane F or first picture IM1, and the $X_P$- and $Y_P$-axes extend horizontally and vertically, respectively. The reference points 32, 34 and 36 photographed on the first picture IM1 are represented by two-dimensional coordinates $p_1(xp_1, yp_1)$, $p_2(xp_2, yp_2)$ and $p_3(xp_3, yp_3)$, respectively. Note, the $X_P$-$Y_P$ coordinate system is referred to as a picture-coordinate system hereinafter.

Also, as shown in FIG. 5, the origin of the $X_C$-$Y_C$-$Z_C$ coordinate system coincides with the back principal point M (M1), the $Z_C$-axis coincides with the optical axis O1, and the respective $X_C$- and $Y_C$-axes are in parallel to the $X_P$- and $Y_P$-axes of the two-dimensional coordinate system $X_P$-$Y_P$. The origin of the $X_C$-$Y_C$-$Z_C$ coordinate system or back principal point M is represented by three-dimensional coordinates M($\Delta X$, $\Delta Y$, $\Delta Z$) which are based on the first scene coordinate system ($X_S$-$Y_S$-$Z_S$). An orientation of the $Z_C$-axis or optical axis O1 is represented by three-dimensional angular coordinates ($\alpha$, $\beta$, $\gamma$) which are defined with respect to the first scene coordinate system ($X_S$-$Y_S$-$Z_S$). Namely, the $Z_C$-axis or optical axis O1 defines angles of α, β and γ with the $X_S$-, $Y_S$- and $Z_S$-axes of the first scene coordinate system, respectively.

When two-dimensional coordinates $p_i(xp_i, yp_i)$ (i=1, 2, 3), representing the coordinates $p_1(xp_1, yp_1)$, $p_2(xp_2, yp_2)$ and $p_3(xp_3, yp_3)$ based on the picture coordinate system ($X_P$-$Y_P$) are expressed by three-dimensional coordinates $P_{ci}(P_{cxi}, P_{cyi}, P_{czi})$ based on the camera coordinate system ($X_C$-$Y_C$-$Z_C$), the X-coordinate $xp_i$ and the Y-coordinate $yp_i$ are represented by the following formulas (1) and (2), respectively:

$$xp_i = f(P_{cxi}/P_{czi}) \quad (1)$$

$$yp_i = f(P_{cyi}/P_{czi}) \quad (2)$$

Herein: "i"=1, 2 or 3, and "f" is the focal distance.

On the other hand, the three-dimensional coordinates $P_{ci}(P_{cxi}, P_{cyi}, P_{czi})$ based on the camera coordinate system ($X_C$-$Y_C$-$Z_C$) is expressed by three-dimensional coordinates $P_{si}(P_{sxi}, P_{syi}, P_{szi})$ based on the scene coordinate system ($X_S$-$Y_S$-$Z_S$) as follows:

$$P_{ci} = R(P_{si} - \Delta) \quad (3)$$

$$R = \begin{pmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\sin\gamma & \cos\alpha\cos\gamma - \sin\alpha\sin\beta\sin\gamma & \sin\alpha\cos\gamma + \cos\alpha\sin\beta\sin\gamma \\ \cos\beta & -\sin\alpha\cos\beta & \cos\alpha\cos\beta \end{pmatrix}$$

$$\Delta = \begin{pmatrix} \Delta X \\ \Delta Y \\ \Delta Z \end{pmatrix}$$

Herein: "R" is a rotational matrix of the angles α, β, γ, and "Δ" is a vector representing a movement distance of the origin of the camera coordinate system ($X_C$-$Y_C$-$Z_C$) from the origin of the scene coordinate system ($X_S$-$Y_S$-$Z_S$).

In short, the three-dimensional coordinates M(ΔX, ΔY, ΔZ) and the three-dimensional angular coordinates (α, β, γ) are calculated by the formulas (1), (2) and (3), whereby the back principal point M or first photographing position M1 is spatially determined with respect to the scene coordinate system ($X_S$-$Y_S$-$Z_S$).

In reality, each of the reference points 32, 34 and 36 is represented as a small white circle, which is formed at a center of a circular black plate element attached to an L-shaped member. By suitably processing a frame of image data read from the memory card 13, the small white circles, representing the reference points 32, 34 and 36, are extracted from the frame of image data by the CPU 14, and then the two-dimensional coordinates of each reference point (32, 34, 36) are determined with respect to the picture coordinate system ($X_P$-$Y_P$), resulting in the definition of the scene coordinate system ($X_S$-$Y_S$-$Z_S$).

The remaining photographing positions M2 to M18 are spatially determined in substantially the same manner as mentioned above. Of course, the spatial determination of the photographing positions M2 to M6 are executed with respect the first scene coordinate system ($X_S$-$Y_S$-$Z_S$) defined on the target TG located at the first target position RP1, the spatial determination of the photographing positions M7 to M10 are performed with respect to a second scene coordinate system defined on the target TG located at the second target position RP2, and the spatial determination of the photographing positions M11 to M18 are executed with respect to a third scene coordinate system defined on the target TG located at the third target position RP3.

Note, the above-mentioned spatial determination of the photographing positions M1 to M18 is automatically executed when the eighteen frames of image data are read from the memory-card 13.

When the survey map of the roadway is produced by successively connecting the nine survey map sections to each other, the spatial determination of all the eighteen photographing positions M1 to M18 must be united with respect to any one of the first, second and third scene coordinate systems. For example, when the first scene coordinate system ($X_S$-$Y_S$-$Z_S$) is selected for the determination of all the photographing positions M1 to M18, the second and third scene coordinate systems must be transformed into the first coordinate system ($X_S$-$Y_S$-$Z_S$).

Figure 7:
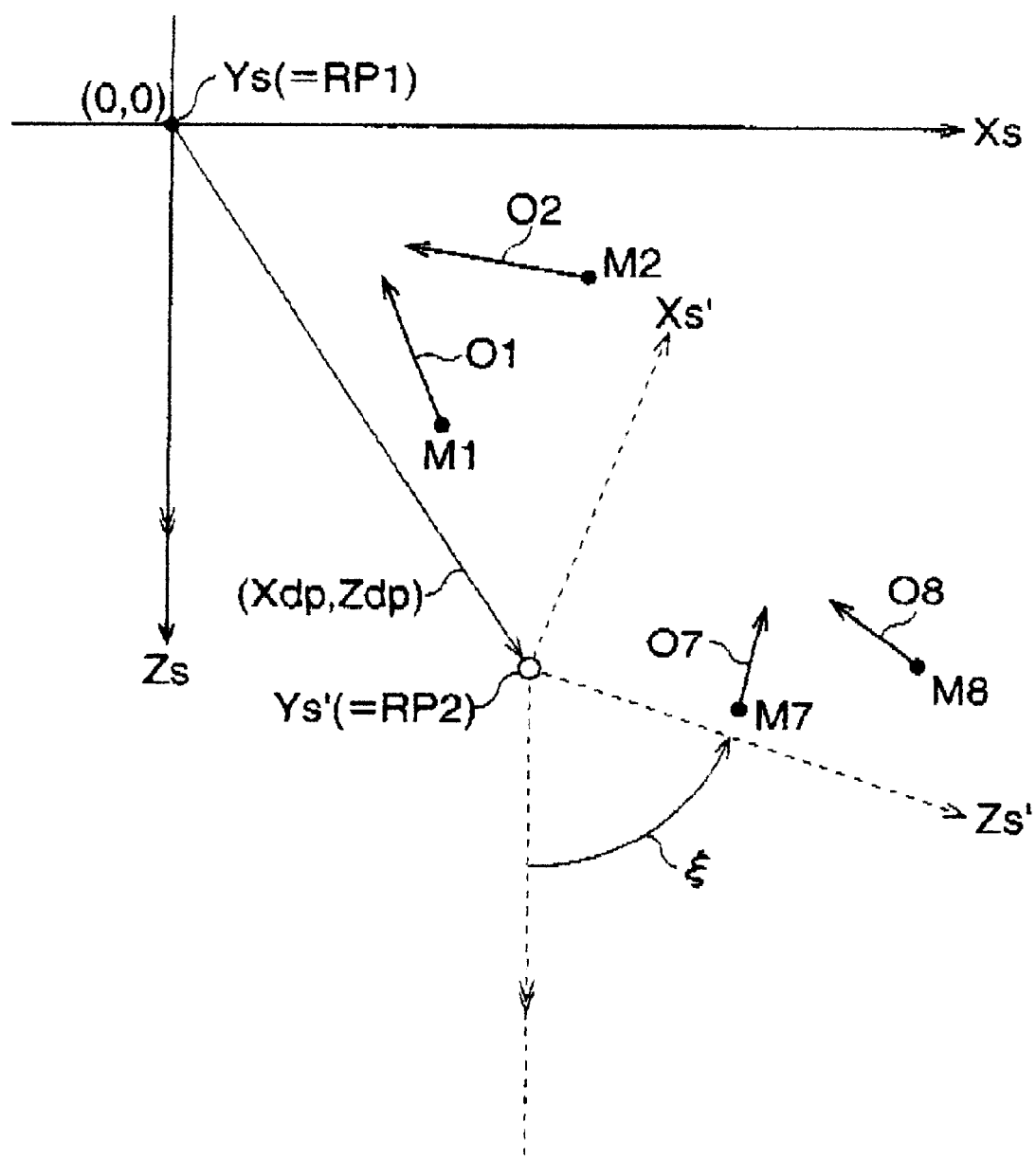
FIG. 7 is a geometrical and conceptual illustration showing a transformation of a second scene coordinate system, defined on the target moved from the position shown in FIG. 4.

Referring to FIG. 7, the transformation of the second scene coordinate system into the first scene coordinate system ($X_S$-$Y_S$-$Z_S$) is conceptually shown. In this drawing, the three axes of the second scene coordinate system are indicated by references $X_S'$, $Y_S'$ and $Z_S'$, and the movement distance of the target TG from the first target position RP1 to the second target position RP2 is represented by two-dimensional coordinates ($X_{dp}$, $Z_{dp}$) based on the first scene coordinate system ($X_S$-$Y_S$-$Z_S$). Also, an angle of ξ indicates a relative rotational angle of the target TG between the first and second target positions RP1 and RP2. Note, in FIG. 7, each of references O2, O7 and O8 indicates an orientation of the optical axis of the camera 50 located at the corresponding photographing position (M2, M7, M8).

The two-dimensional coordinates ($X_{dp}$, $Z_{dp}$) and the rotational angle of ξ are determined by calculating the three-dimensional coordinates of the connection points RC1 and RC2 of the cone-shaped markers MK1 and MK2 with respect to the first and second scene coordinate systems ($X_S$-$Y_S$-$Z_S$, $X_S'$-$Y_S'$-$Z_S'$), respectively.

After the determination of the two-dimensional coordinates ($X_{dp}$, $Z_{dp}$) and the rotational angle of ξ, the transformation of the second scene coordinate system ($X_S'$-$Y_S'$-$Z_S'$) into the first scene coordinate system ($X_S$-$Y_S$-$Z_S$) is performed on the basis of the following formula (4):

$$\begin{pmatrix} X_S \\ Z_S \end{pmatrix} = \begin{pmatrix} \cos\xi & -\sin\xi \\ \sin\xi & \cos\xi \end{pmatrix} \begin{pmatrix} X_S' \\ Z_S' \end{pmatrix} + \begin{pmatrix} X_{dp} \\ Z_{dp} \end{pmatrix} \quad (4)$$

Of course, the transformation of the third scene coordinate system into the first scene coordinate system ($X_S$-$Y_S$-$Z_S$) is performed in substantially the same manner as mentioned above.

Before the survey map can be obtained with a given accuracy, each of the survey map sections must be produced based on a pair of common partial areas on the pictures in a corresponding pair. Each of the common partial areas is referred to as an effective area for ensuring the production of the survey map section with the given accuracy, and the effective area is defined by a first or near-side limit and a second or far-side limit.

For example, the near-side limit of the effective area on each picture included in a pair is determined based on three-dimensional coordinates M(ΔX, ΔY, ΔZ) and three-dimensional angular coordinates (α, β, γ) as defined in FIG. 5, and based on horizontal and vertical view-angle data, and the resolving-power data of the CCD image sensor of the camera 50, which are stored in a subheader area H3 of a corresponding memory-area section ($PD_n$).

Figure 8:
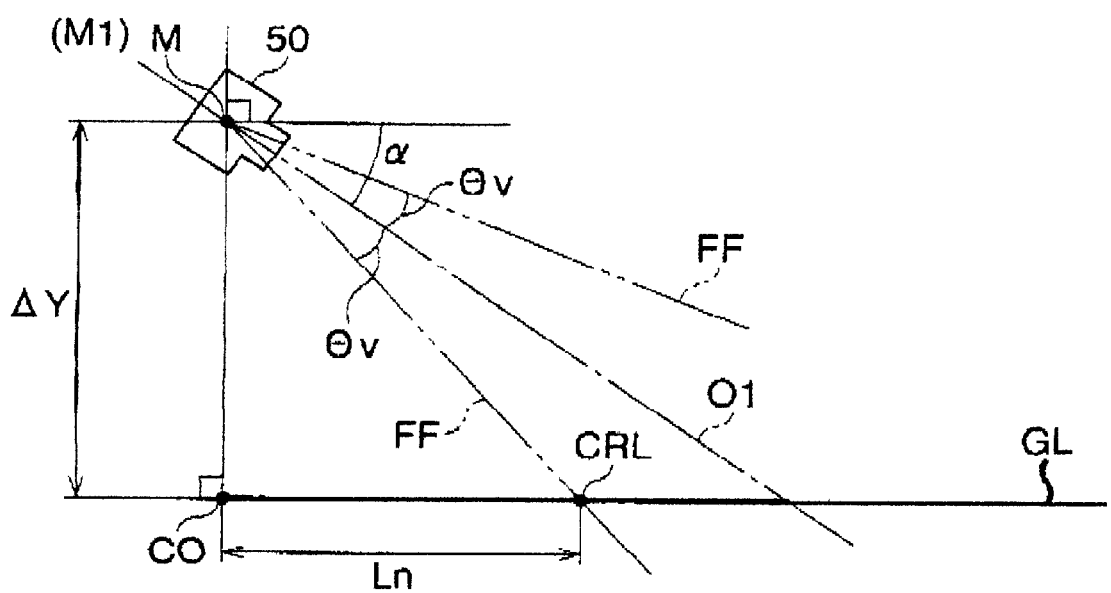
FIG. 8 is a geometrical and conceptual illustration for explaining a first limit defining an effective area on a picture for ensuring production of a survey map section with a given accuracy.

In particular, with reference to FIG. 8, a relationship between a ground level GL of the roadway and the camera 50 is geometrically illustrated. As shown in this drawing, the camera 50 is situated at a height, measured from the ground level GL, which is represented by the Y-component ΔY of the coordinates M(ΔX, ΔY, ΔZ), and each of the vertical view-angles is indicated by reference $\theta_V$. Note, similar to FIG. 4, references FF indicate boundaries of view-angles $\theta_V$, and, similar to FIG. 5, reference α indicates the angle defined between an optical axis O and an X-axis of a scene coordinate system ($X_S$-$Y_S$-$Z_S$).

As shown in FIG. 8, one of the boundaries FF defines an intersection line CRL with respect to a plane representing the ground level GL, and the intersection line CRL defines the near-side limit of the effective area on the picture, which is represented by a minimum distance $L_n$ measured from the intersection line CRL to a vertically-projected point CO of a back principal point M on the plane of the ground level GL. The minimum distance $L_n$ is determined based on the following formula:

$$L_n = \Delta Y \cdot cot(\alpha + \theta_V) \quad (5)$$

Figure 9:
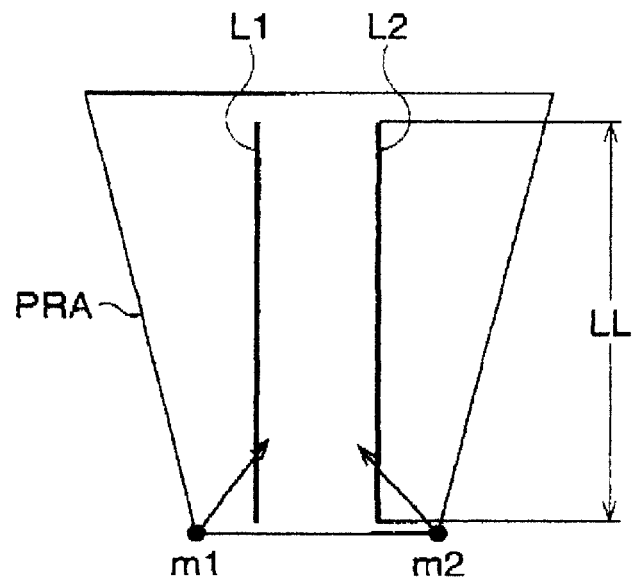
FIG. 9 is a geometrical and conceptual illustration for explaining a second limit defining the effective area for ensuring the production of the survey map section with the given accuracy.
Figure 10:
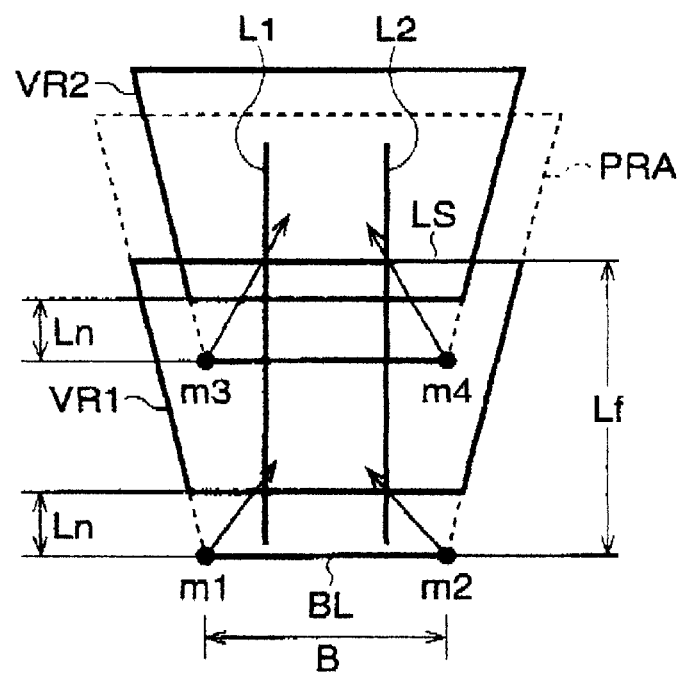
FIG. 10 is another geometrical and conceptual illustration for explaining the second limit defining the effective area for ensuring the production of the survey map section with the given accuracy.

On the other hand, the far-side limit of the effective areas on the pictures included in the pair is defined, as shown in FIGS. 9 and 10.

In particular, in FIG. 9, reference PRA indicates a common photographing area defined by the pair of pictures obtained at photographing positions m1 and m2, and references L1 and L2 indicates sides of a section of a roadway having a length LL in the photographing area PRA. Note, similar to FIG. 1, an arrow is projected from each of the photographing positions m1 and m2 to indicate a photographing direction at the corresponding photographing position, and the photographing direction is defined as an orientation of the optical axis of the photographing optical system of the camera 50.

In FIG. 10, the far-side limit of the effective areas on the pictures included in the pair is represented by a line segment LS spaced apart by a distance of Lf from a base-line segment BL extending between the photographing positions m1 and m2. The distance of Lf is determined based on the following formula (6):

$$Lf = \sqrt{(AE \cdot B \cdot f)/rp} \quad (6)$$

Herein: "AE" is a value tolerance which may be suitably predetermined; "B" is a length of the base-line BL; "f" is the focal distance; and "rp" is the resolving-power of the CCD image sensor of the camera 50.

In short, the effective area on the pair of pictures concerned for ensuring the production of the survey map section with the given accuracy is represented by a trapezoid area, indicated by reference VR1 in FIG. 10, which is defined by the near-side limit ($L_n$) and the far-side limit (Lf). Thus, as shown in FIG. 10, an effective area VR2 on a consecutive pair of pictures based on photographing positions m3 and m4 must be partially overlapped on the effective area VR1, before the two adjacent survey map sections to be connected to each other can be produced with the given accuracy.

Note, the larger the tolerance value AE, the longer the distance of Lf, but the accuracy of a survey map becomes lower, and, the smaller the tolerance value AE, the shorter the distance of Lf, but the accuracy of a survey map becomes higher.

As is apparent from the foregoing, there is a close relationship between two pictures included in a pair for producing a survey map section. Thus, in the example of FIG. 1, when the nine pairs of pictures, obtained at the eighteen photographing positions M1 to M18, are displayed on the monitor 10, a given pair of pictures can be easily and visually recognized among the eighteen pictures.

Figure 11:
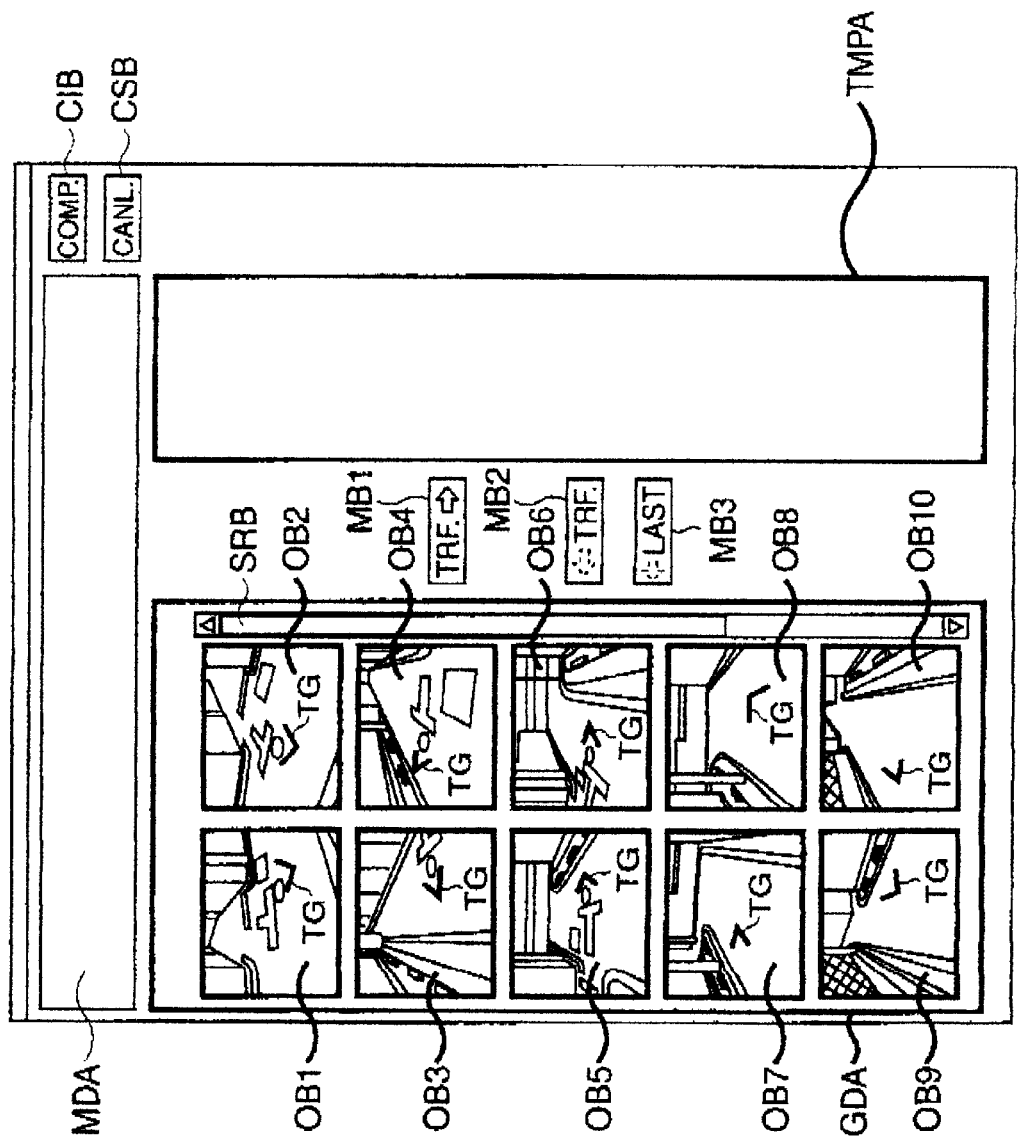
FIG. 11 is a view showing a picture-arrangement-mode scene of a monitor included in the photogrammetric image processing computer system according to the present invention.

FIG. 11 shows, by way of example, a picture-arrangement-mode scene displayed on the monitor 10 for arranging the nine pairs of pictures produced based on the eighteen frames of image data read from the memory card 13. Note, the picture-arranging-mode scene is selected from an initial menu scene (not shown) displayed on the monitor 10 after the image processing computer system is powered ON. As shown in FIG. 11, the picture-arranging-mode scene includes a picture-arranging-display area GDA, a picture-shunting-display area TMPA, and a message-display area MDA.

The picture-arranging-display area GDA is used to display the eighteen pictures obtained at the photographing positions M1 to M18, respectively. Namely, the display of each picture on the display area GDA is performed at a reduced size, and the reduced sized picture is referred to as an object, hereinafter. In FIG. 11, the ten objects, indicated by references OB1 to OB10, correspond to the pictures obtained at the photographing positions M1 to M10, respectively. Although the remaining eight objects, corresponding to the pictures obtained at the photographing positions M11 to M18, respectively, are not displayed on the display area GDA, the display of the remaining objects is possible by operating a scroll bar SRB with the mouse. Note, of course, the remaining eight objects are to be indicated by references OB11 to OB18, respectively. Image data for the objects OB1 to OB18 are produced based on the eighteen frames of image data read from the memory card 13, and are stored in the display memory 20.

As is apparent from FIG. 11, the nine pairs of objects (OB1 and OB2; OB3 and OB4; OB5 and OB6; OB7 and OB8; OB9 and OB10; OB11 and OB12; OB13 and OB14; OB15 and OB16; and OB17 and OB18) are arranged on the display area GDA in the photographing order so as to form a pair of columns, and the arrangement of the nine pairs of objects is automatically performed when the picture-arranging-mode scene is selected from the initial menu scene displayed on the monitor 10.

As stated with reference to FIG. 1, when the eighteen photographing operations (M1 to M18) are consecutively and continuously performed without an additional photographing operation intervening, two pictures or objects included in each pair for producing a survey map section are properly and orderly arranged side by side on the display area GDA, as shown in FIG. 11. Of course, in this case, it is unnecessary to rearrange the nine pairs of objects on the display area GDA.

Nevertheless, if an additional photographing operation is performed between, for example, the second and third photographing operations M2 and M3, an object, corresponding a picture obtained by the additional photographing operation, intervenes between the second and third objects. In this case, the nineteen frames of image data are stored in the memory card 13, and the nineteen objects are displayed and arranged on the display area GDA, as shown FIG. 12 in which the additional object is indicated by reference OBX. As is apparent from this drawing, although the two objects OB1 and OB2 included in the first pair are properly arranged side by side, two objects included in each remaining pair are not properly arranged due to the intervention of the additional object OBX between the second and third objects OB2 and OB3.

Note, the additional photographing operation may be performed to photograph and record, for example, evidence or circumstances concerning an traffic accident, regardless of the photogrammetric analytical measurement.

An existence of the additional object OBX can be easily and visually recognized by an operator, because there is no close relationship between the additional object OBX and the object OB3, as explained with reference to FIG. 10. Thus, it is possible for the operator to easily select the additional object OBX from among the nineteen objects.

Figure 12:
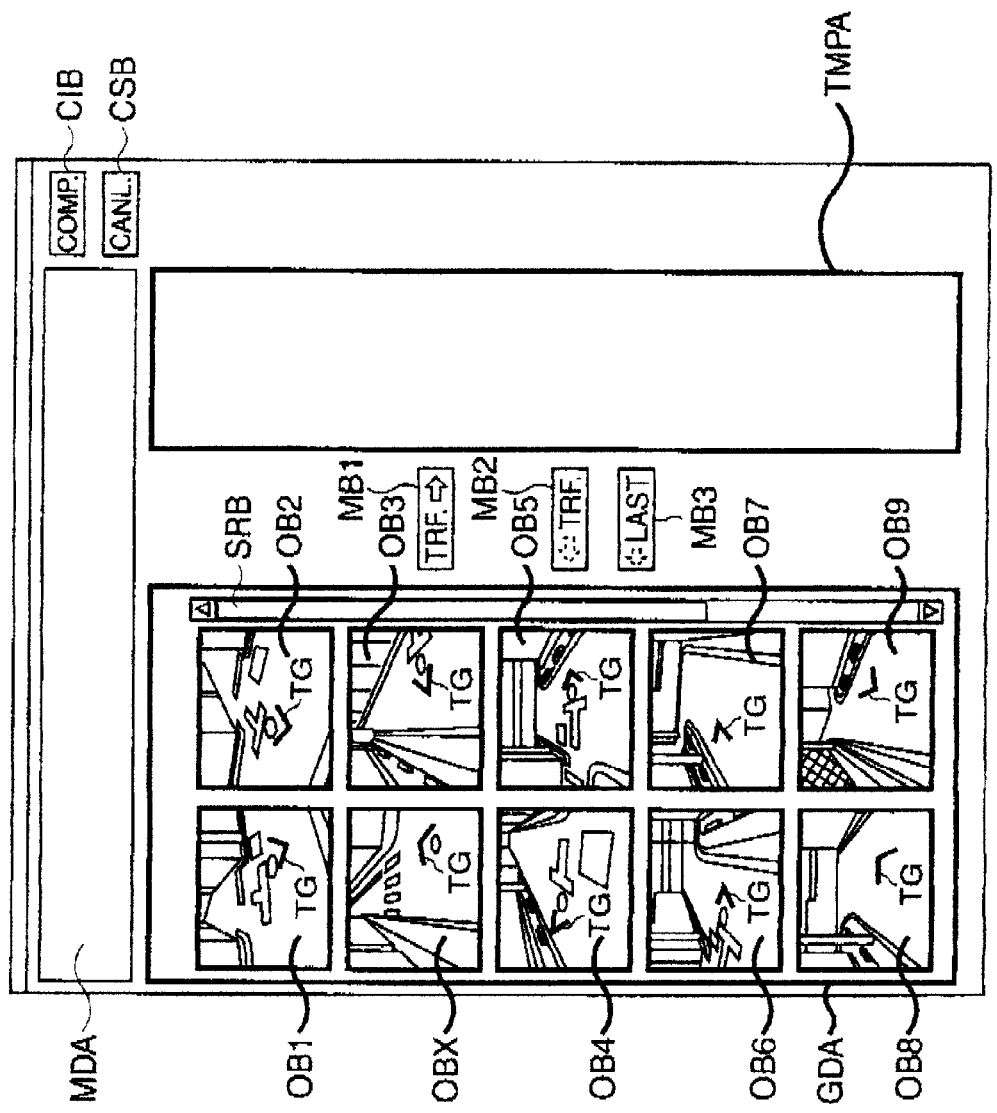
FIG. 12 is a view, similar to FIG. 11, showing the picture-arrangement-mode scene at an aspect different from FIG. 11.
Figure 13:
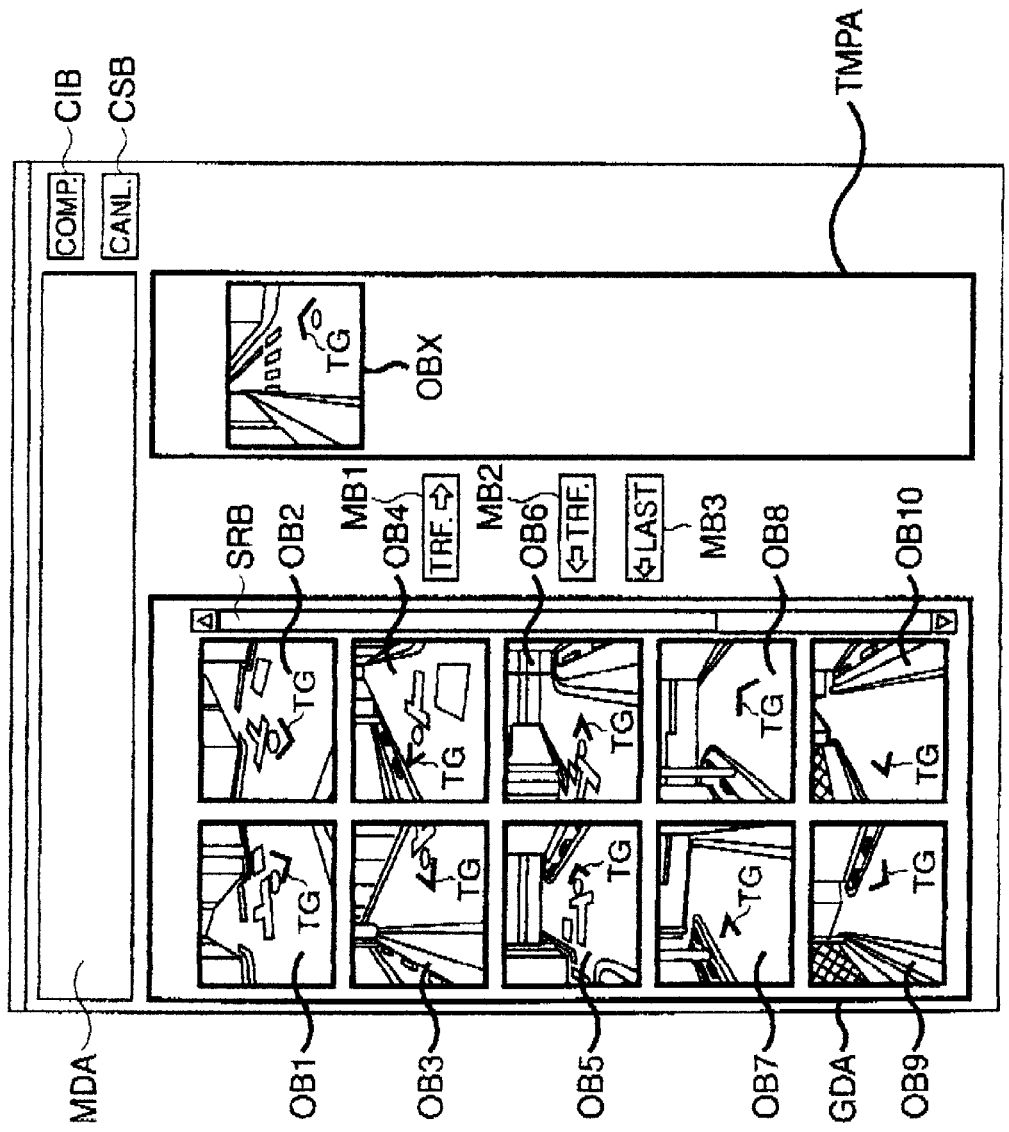
FIG. 13 is a view, similar to FIG. 11, showing the picture-arrangement-mode scene at another aspect different from FIG. 11.

In the case as shown in FIG. 12, the objects OB1 to OB18 must be rearranged such that the proper arrangement of the objects OB1 to OB18 can be obtained as shown in FIG. 11, and the rearrangement of the objects OB1 to OB18 is performed by temporarily transferring the additional object OBX from the picture-arranging-display area GDA to the picture-shunting-display area TMPA, as shown in FIG. 13.

For the rearrangement of the objects OB1 to OB18, three object-transferring buttons MB1, MB2 and MB3 are displayed on the picture-arranging mode scene (FIGS. 11, 12 and 13) between the display areas GDA and TMPA. The first object-transferring button MB1 is used to transfer an object from the picture-arranging-display area GDA to the picture-shunting-display area TMPA, and the second and third object-transferring buttons MB2 and MB3 are used to return an object from the picture-shunting-display area TMPA to the picture-arranging-display area GDA.

In particular, for example, before the additional object OBX can be transferred from the display area GDA to the display area TMPA, first, the additional object OBX must be indicated by clicking on it with the mouse, to reverse the additional object OBX to a negative object image, whereby the additional object OBX can be visually distinguished from the remaining objects. Then, when the first object-transferring button MB1 is operated by clicking on it with the mouse, the transfer of the additional object OBX from the display area GDA to the display area TMPA is completed, whereby the objects OB1 to OB18 can be properly rearranged on the picture-arranging-display area GDA, as shown in FIG. 13, similar to the case shown in FIG. 11.

Also, there may be a case where three photographing operations are carefully performed to produce a survey map section for which a pair of pictures should be selected from the three pictures derived from the three photographing operations. In this case, the first object-transferring button MB1 can be used to eliminate one of the three pictures or objects derived from the three photographing operations, whereby a proper rearrangement of the objects can be obtained on the picture-arranging-display area GDA.

When an object is erroneously transferred from the display area GDA to the display area TMPA, it is possible to return the object concerned from the display area TMPA to the display area GDA, using the second object-transferring button MB2. In particular, first, an object displayed on the area TMPA is indicated by clicking on it with the mouse, and then an object, displayed on the area GDA at a location at which the object concerned is to be returned, is indicated by clicking on it with the mouse. After the indication of both the objects, when the second object-transferring button MB2 is operated by clicking on it with the mouse, the return of the object concerned from the area TMPA to the area GDA is performed such that the object concerned is displayed at the location at which the indicated object is displayed on the area GDA.

For example, when the additional object OBX shown in FIG. 13 is returned to the original location on the display area GDA, the additional object OBX and the object OB3 are indicated by clicking on them with the mouse, and the return of the additional object OBX to the original location on the area GDA is performed by operating the button MB2 by clicking on it with the mouse, whereby the arrangement of the objects on the area GDA is again returned as shown in FIG. 12.

Although it is preferable to orderly perform a series of photographing operations for the photogrammetric analytical measurement, as stated with reference to FIG. 1, in reality, the photographing operations may be disorderedly performed for various reasons. In this case, it is necessary to thoroughly rearrange objects disorderedly displayed on the picture-arranging-display area GDA, before a proper arrangement of the objects can be obtained. It is possible to advantageously utilize the third object-transferring button MB3 for the thorough rearrangement of the objects. In particular, after an object, displayed on the display area TMPA, is indicated by clicking on it with mouse, when the button MB3 is operated by clicking on it with the mouse, the indicated object is returned to the display area GDA, and is then displayed at an end location of either column of the objects displayed on the display area GDA.

Thus, when some objects are rearranged on the display area GDA, objects having no relation to the rearrangement of the objects concerned can be successively moved to the end locations of the columns of the objects displayed on the display area GDA, thereby facilitating the rearrangement of the objects concerned.

Note, whenever an object displayed on either the picture-arranging-display area GDA or the picture-shunting-display area TMPA is indicated by clicking on it with the mouse, the indicated object is reversed to a negative image object.

The message-displayed area MDA is utilized to display various messages for properly guiding the operator while various processings are executed under command of the operator for the rearrangement of the objects.

As shown in FIGS. 11, 12 and 13, a completion button CIB and a cancel button CSB are displayed adjacent to the message-display area MDA on the picture-arranging-mode scene of the monitor 10.

After the proper arrangement of the objects is obtained on the display area GDA, as shown in FIG. 11 or 13, when the completion button CIB is operated by clicking on it with the mouse, two pictures, corresponding to two objects arranged side by side on the display area GDA, are fixed as forming a pair for producing a survey map section, and the nine pairs of pictures (OB1 and OB2; OB3 and OB4; OB5 and OB6; OB7 and OB8; OB9 and OB10; OB11 and OB12; OB13 and OB14; OB15 and OB16; and OPB17 and OB18) are stored in the working memory 19. Then, the picture-arranging-mode scene of the monitor 10 is returned to the initial menu scene.

When an object is erroneously indicated on either display area GDA or TMPA by clicking on it with the mouse, it is possible to cancel the erroneous indication of the object by operating the cancel button CSB by clicking on it with the mouse.

Each of the objects is displayed on only one of the picture-arranging-display area GDA and the picture-shunting-display area TMPA. Namely, each of the objects cannot be simultaneously displayed on both the display areas GDA and TMPA.

For this end, a USE-list memory-area and an UNUSE-list memory-area are defined in the working memory 19. Consecutive object-numbers, which represent plural frames of image data read from the memory card 13 in the photographing order, are initially stored in the USE-list memory-area, whereby the objects are displayed on the picture-arranging-display area GDA, as shown in FIG. 11 or 12. On the other hand, the UNUSE-list memory-area is initially cleared, whereby no display of objects on the picture-shunting-display area TMPA is performed.

For example, when the nineteen frames of image data, corresponding to the nineteen objects to be displayed on the display area GDA shown in FIG. 12, are read from the memory card 13 in the photographing order, the consecutive object-number "1" to "19" are listed in the USE-list memory-area. In this case, of course, the respective object-numbers "1" and "2" represent the objects OB1 and OB2, the object-number "3" represents the additional object OBX, and the respective object-numbers "4" to "19" represent the objects OB3 to OB18.

As mentioned above, for example, when the additional object OBX is transferred from the display area GDA to the display area TMPA, the object-number "3" representing the additional object OBX is eliminated from the USE-list memory-area, and the eliminated object-number "3" are added to the UNUSE-list memory-area, whereby the additional object OBX is enabled to be displayed on the display area TMPA, but cannot be displayed on the display area GDA.

Also, as mentioned above, when the additional object OBX displayed on the display area TMPA is returned to the original location on the display area GDA, the object-number "3" representing the additional object OBX is eliminated from the UNUSE-list memory-area, and the eliminated object-number "3" is wedged in the list-position of the USE-list memory-area, at which the object-number "4" representing the object OB3 is listed, with the object-numbers "4" to "19" being moved down in the USE-list memory-area.

Further, as mentioned above, when an object displayed on the display area TMPA is returned to the display area GDA, and is then displayed at an end location of either column of the objects displayed on the display area GDA, the object-number representing the object concerned is eliminated from the UNUSE-list memory-area, and the eliminated object-number is added to the USE-list memory-area so as to be listed at a last list-position of the USE-list memory-area.

Figure 14:
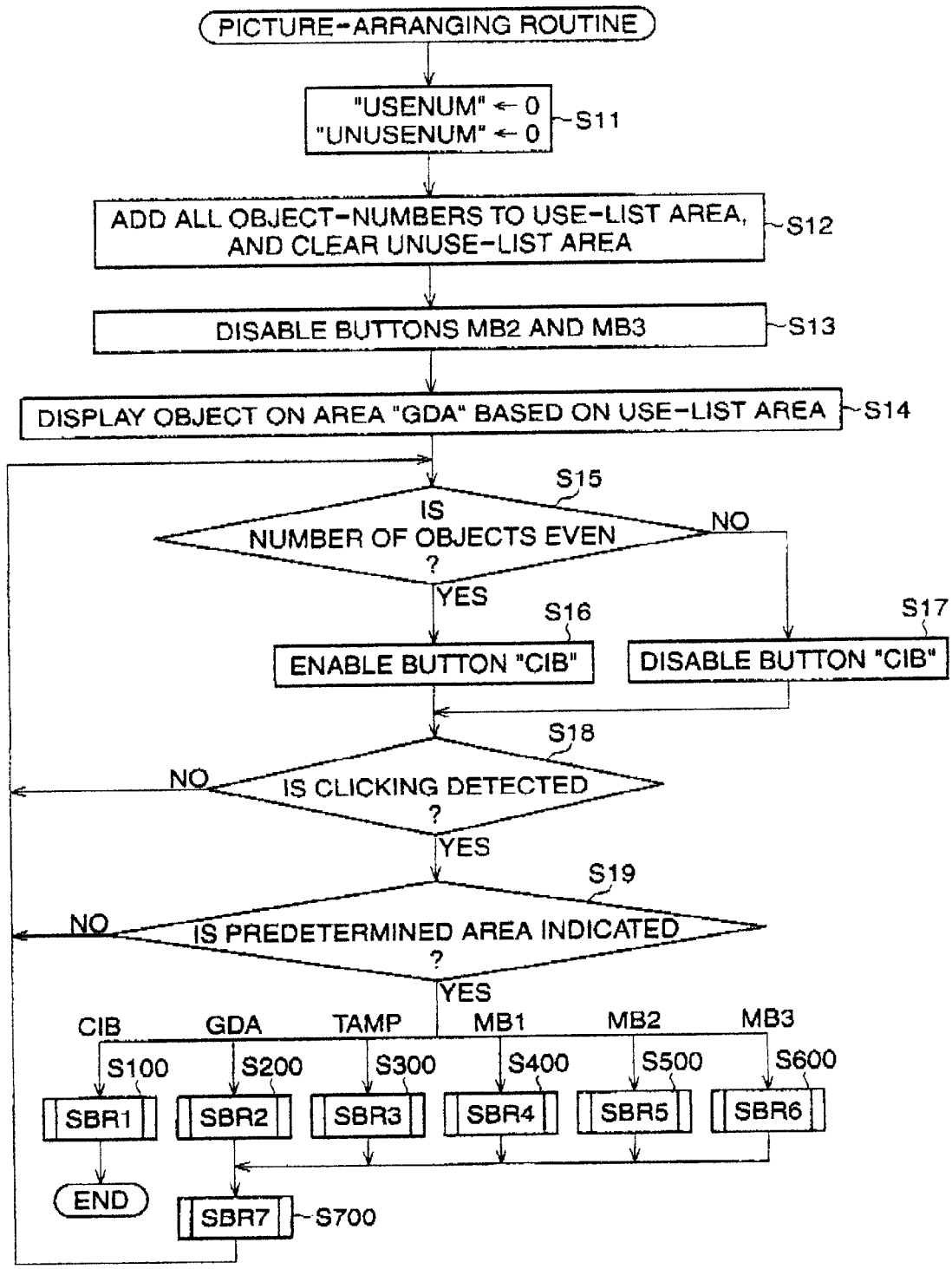
FIG. 14 is a flowchart for a picture-arranging routine executed in the photogrammetric image processing computer system according to the present invention.

FIG. 14 shows a flowchart for a picture-arranging routine, which is executed when the picture-arranging-mode scene is selected from the initial menu scene of the monitor 10, as shown in FIG. 11 or 12.

At step S11, variables "USENUM" and "UNUSENUM" are reset to be "0".

The variable "USENUM" is used to represent whether an object is indicated on the picture-arranging-display area GDA by clicking on it with the mouse. When the indication of an object on the display area GDA is confirmed, the variable "USENUM" is made to be an object-number corresponding to the indicated object. For example, when the additional object OBX is indicated on the display area GDA of FIG. 12 by clicking on it with the mouse, the variable "USENUM" is made to be "3", which is the object-number representing the additional object OBX.

The variable "UNUSENUM" is used to represent whether an object is indicated on the picture-shunting-display area TMPA by clicking on it with the mouse. When the indication of an object on the display area TMPA is confirmed, the variable "UNUSENUM" is made to be an object-number corresponding to the indicated object. For example, the additional object OBX is indicated on the display area TMPA of FIG. 13 by clicking on it with the mouse, the variable "UNUSENUM" is made to be "3", which is the object-number representing the additional object OBX.

At step S12, all consecutive object-numbers, which represent plural frames of image data read from the memory card 13 in the photographing order, are added in the USE-list memory-area defined in the working memory 19, and the UNUSE-list memory-area defined in the working memory 19 is cleared.

At step S13, the second and third object-transferring buttons MB2 and MB3 are disabled, because as the UNUSE-list is cleared there is no object on the display area TMPA to be returned to the display area GDA. Each of the disabled buttons MB2 and MB3 is displayed at a lower displaying-density on the picture-arranging-mode scene of the monitor 10, whereby it can be visually recognized by the operator whether each of the buttons MB2 and MB3 is disabled or enabled. Of course, although each of the disabled buttons MB2 and MB3 may be operated by clicking on it with the mouse, the operation of each button is disabled.

At step S14, all the objects are displayed on the picture-arranging-display area GDA in accordance with the object-numbers listed on the USE-list memory-area, as shown in FIG. 11 or 12. Of course, when a number of the objects is more than ten, the display area GDA must be scrolled by operating the scroll bar SRB with the mouse, before all the objects can be observed on the monitor 10.

At Step S15, it is determined whether the number of the objects displayed on the display area GDA is even. If the number of objects is even, the control proceeds to step S16, in which the completion button CIB is enabled. The enabled button CIB is displayed at a higher displaying-density on the picture-arranging-mode scene of the monitor 10, whereby it can be visually recognized by the operator that the completion button CIB is enabled.

On the other hand, at step S15, if the number of the objects is odd, the control proceeds from step S15 to step S17, in which the completion button CIB is disabled. The disabled button CIB is displayed at a lower displaying-density on the picture-arranging-mode scene of the monitor 10, whereby it can be visually recognized by the operator that the button CIB is disabled. Of course, although the disabled button CIB may be operated by clicking on it with the mouse, the operation of the button CIB is disabled.

At step S18, it is monitored whether a clicking operation is performed with the mouse. When the clicking operation is not confirmed, the control returns to step S15.

At step S18, when the clicking operation is confirmed, the control proceeds to step S19, in which it is determined whether a predetermined area is indicated by the pointer (not shown in FIGS. 11, 12 and 13) during the performance of the clicking operation.

At step S19, when the predetermined area, indicated by the pointer, is the completion button CIB, the control proceeds to step S100, in which a subroutine SBR1 is executed. After the execution of the subroutine SBR1, the picture-arranging routine ends, and the picture-arranging-mode scene of the monitor 10 (FIG. 11 or 13) is returned to the initial menu scene. Note, the subroutine SBR1 is explained in detail with reference to FIG. 15 hereinafter.

At step S19, when the predetermined area, indicated by the pointer, is the picture-arranging-display area GDA, the control proceeds to step S200, in which a subroutine SBR2 is executed. Note, the subroutine SBR2 is explained in detail with reference to FIG. 16 hereinafter.

At step S19, when the predetermined area, indicated by the pointer, is the picture-shunting-display area TMPA, the control proceeds to step S300, in which a subroutine SBR3 is executed. Note, the subroutine SBR3 is explained in detail with reference to FIG. 17 hereinafter.

At step S19, when the predetermined area, indicated by the pointer, is the first object-transferring button MB1, the control proceeds to step S400, in which a subroutine SBR4 is executed. Note, the subroutine SBR4 is explained in detail with reference to FIG. 18 hereinafter.

At step S19, when the predetermined area, indicated by the pointer, is the second object-transferring button MB2, the control proceeds to step S500, in which a subroutine SBR5 is executed. Note, the subroutine SBR5 is explained in detail with reference to FIG. 19 hereinafter.

At step S19, when the predetermined area, indicated by the pointer, is the third object-transferring button MB3, the control proceeds to step S600, in which a subroutine SBR6 is executed. Note, the subroutine SBR6 is explained in detail with reference to FIG. 20 hereinafter.

After one of the subroutines SBR2, SBR3, SBR4, SBR 5 and SBR6 is executed at a corresponding step (S200, S300, S400, S500, S600), the control proceeds to step S700, in which a subroutine SBR7 is executed. Then, the control returns to step S15. Note, the subroutine SBR7 is explained in detail with reference to FIG. 21 hereinafter.

Figure 15:
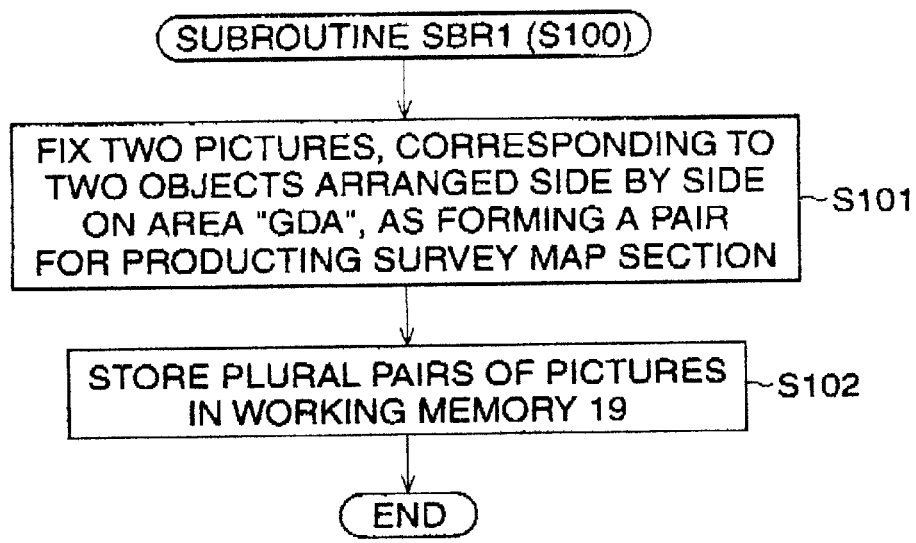
FIG. 15 is a flowchart for a subroutine executed in step S100 of the picture-arranging routine of FIG. 14.

FIG. 15 shows a flowchart for the subroutine SBR1 executed at step S100 of the picture-arranging routine shown in FIG. 14. Of course, the execution of the subroutine SBR1 is started when the clicking operation is performed provided that the completion button CIB is indicated by the pointer.

Note, as mentioned above, after a proper arrangement of objects is obtained on the display area GDA, as shown in FIG. 11 or 13, the completion button CIB is operated by clicking on it with the mouse.

At step S101, two pictures, corresponding two objects arranged side by side on the display area GDA, are fixed as forming a pair for producing a survey map section.

At step S102, the fixed pairs of pictures (e.g. OB1 and OB2; OB3 and OB4; OB5 and OB6; OB7 and OB8; OB9 and OB10; OB11 and OB12; OB13 and OB14; OB15 and OB16; and OB17 and OB18) are stored in the working memory 19. Thus, the picture-arranging routine ends, and the picture-arranging-mode scene of the monitor 10 is returned to the initial menu scene. Thereafter, respective survey map sections are produced based on the pairs of pictures stored in the working memory 19, and a survey map is obtained by successively connecting the survey map sections to each other, like the one shown in FIG. 1.

Figure 16:
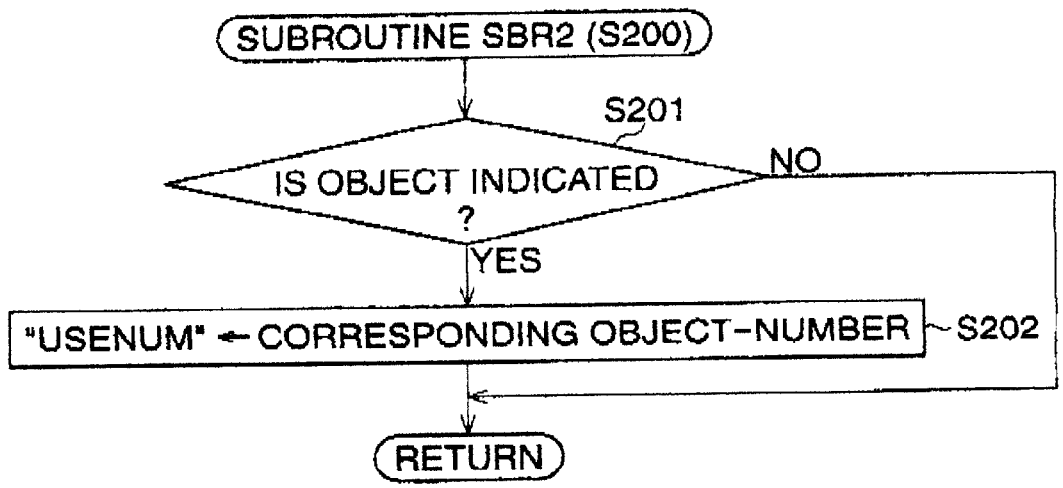
FIG. 16 is a flowchart for a subroutine executed in step S200 of the picture-arranging routine of FIG. 14.

FIG. 16 shows a flowchart for the subroutine SBR2 executed at step S200 of the picture-arranging routine shown in FIG. 14. Of course, the execution of the subroutine SBR2 is started when the clicking operation is performed provided that the pointer is on the picture-arranging-display area GDA.

At step S201, it is determined whether the clicking operation is performed provided that any one of the objects displayed on the picture-arranging-display area GDA is indicated by the pointer. If the pointer is out of the object displayed on the display area GDA, the subroutine SBR2 once ends. Namely, the clicking operation is ignored when the pointer is out of the object displayed on the display area GDA.

At step S201, when it is confirmed that the clicking operation is performed provided that the object is indicated by the pointer, the control proceeds to step S202, in which the variable "USENUM" is set to be an object-number corresponding to the indicated object. For example, in FIG. 12, when the additional object OBX is indicated by clicking on it with the mouse, the variable "USENUM" is set to be "3".

Figure 17:
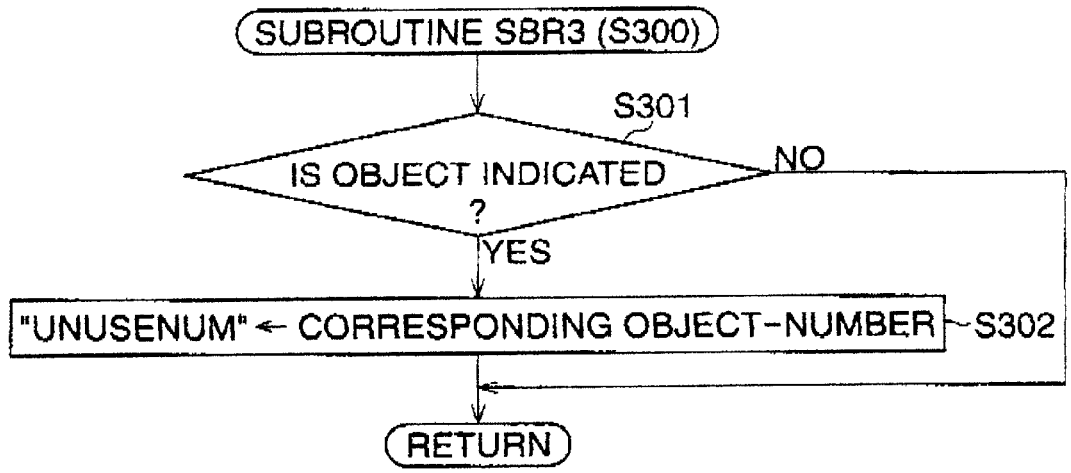
FIG. 17 is a flowchart for a subroutine executed in step S300 of the picture-arranging routine in FIG. 14.

FIG. 17 shows a flowchart for the subroutine SBR3 executed at step S300 of the picture-arranging routine shown in FIG. 14. Of course, the execution of the subroutine SBR3 is started when the clicking operation is performed provided that the pointer is on the picture-shunting-display area TMPA.

At step S301, it is determined whether the clicking operation is performed provided that any one of the objects displayed on the picture-shunting-display area TMPA is indicated by the pointer. If the pointer is out of the object displayed on the display area TMPA, the subroutine SBR3 once ends. Namely, the clicking operation is ignored when the pointer is out of the object displayed on the display area TMPA.

At step S301, when it is confirmed that the clicking operation is performed provided that the object is indicated by the pointer, the control proceeds to step S302, in which the variable "UNUSENUM" is set to be an object-number corresponding to the indicated object. For example, as shown in FIG. 13, when the additional object OBX is indicated by clicking on it with the mouse, the variable "UNUSENUM" is set to be "3".

Figure 18:
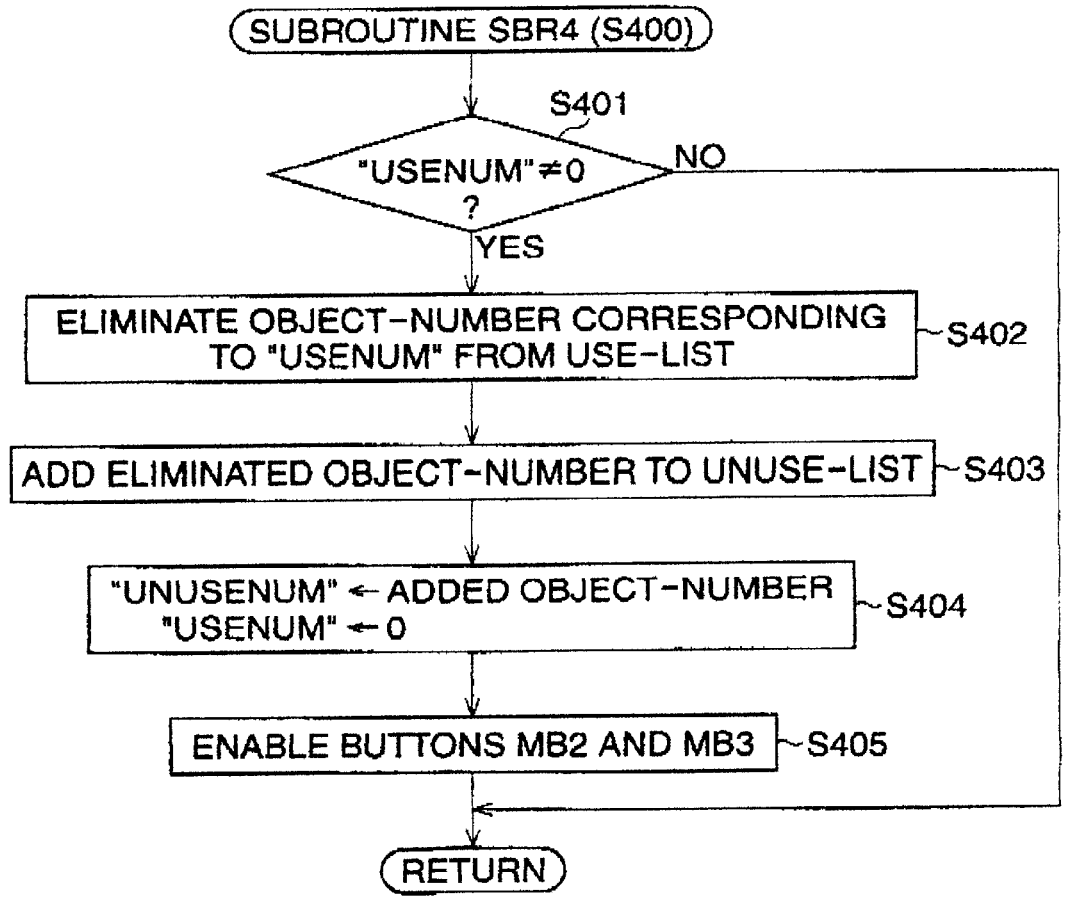
FIG. 18 is a flowchart for a subroutine executed in step S400 of the picture-arranging routine of FIG. 14.

FIG. 18 shows a flowchart for the subroutine SBR4 executed at step S400 of the picture-arranging routine shown in FIG. 14. Of course, the execution of the subroutine SBR4 is started when the clicking operation is performed provided that the first object-transferring button MB1 is indicated by the pointer.

At step S401, it is determined whether the variable "USENUM" is not "0". If USENUM≠0, i.e. if any one of the objects, displayed on the picture-arranging-display area GDA, is indicated by clicking on it with the mouse, the control proceeds to step S402, in which an object-number corresponding to the variable "USENUM" is eliminated from the USE-list memory-area. Then, at step S403, the eliminated object-number is added to the UNUSE-list memory-area, resulting in a transfer of the indicated object from the display area GDA to the display area TMPA. Note, if the UNUSE-list memory-area is emptied, the object number concerned is listed at the first list-position of the UNUSE-list memory-area, and, if more than one object-number are already listed in the UNUSE-list memory-area, the object-number is listed at a last list-position thereof.

At step S404, the variable "UNUSENUM" is set to be the object-number added to the UNUSE-list memory-area, and the variable "USENUM" is reset to be "0". Then, at step S405, the second and third object-transferring buttons M2 and M3 are enabled due to the transfer of the object from the display area GDA to the display area TMPA. Note, the enabled buttons M2 and M3 are displayed at a higher displaying-density, whereby it can be visually recognized by the operator that the buttons M2 and M3 are enabled.

At step S401, if USENUM=0, i.e. if none of the objects, displayed on the picture-arranging-display area GDA, is indicated by clicking on it with the mouse, the subroutine SBR4 once ends. Namely, when no indication of object is performed on the display area GDA, the operation of the first object-transferring button MB1 is ignored.

Figure 19:
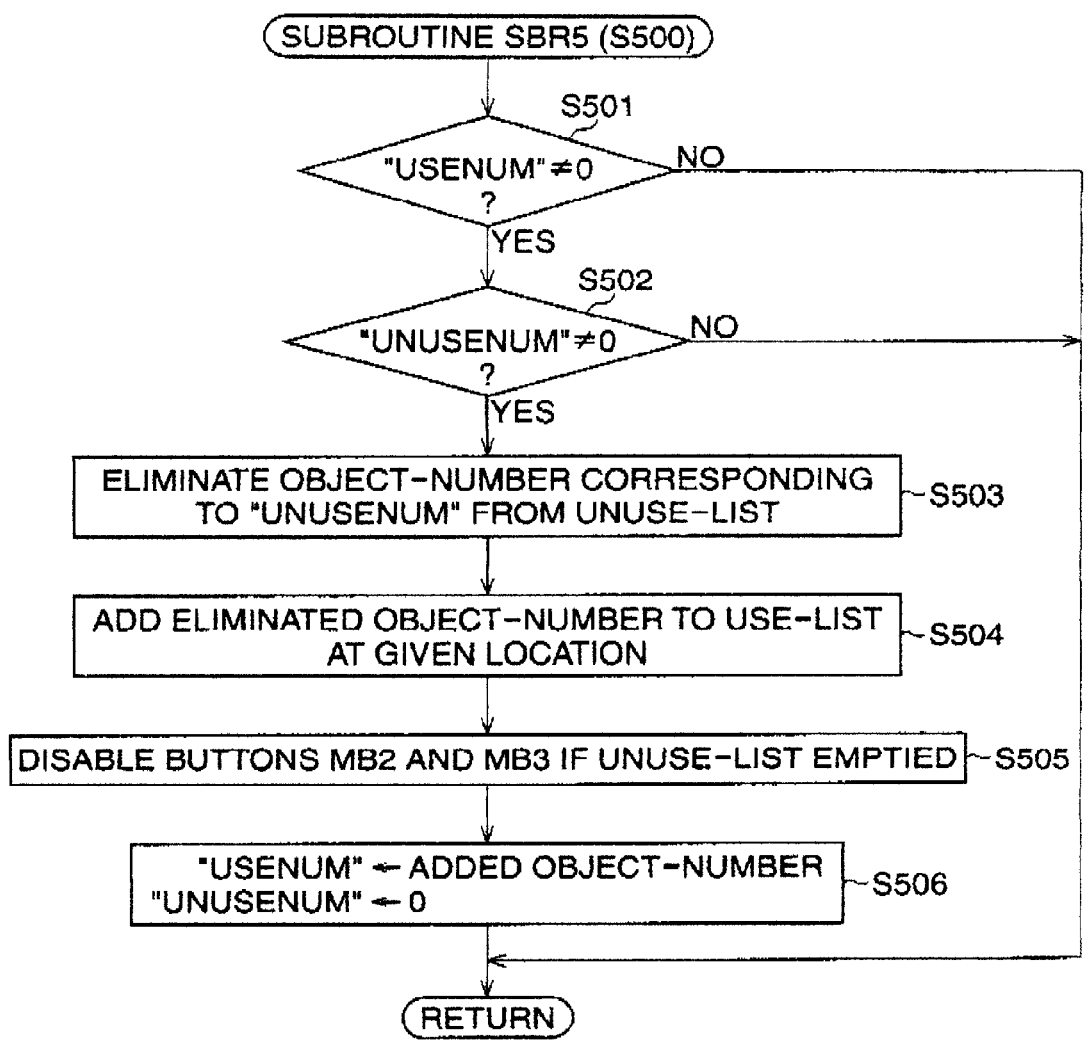
FIG. 19 is a flowchart for a subroutine executed in step S500 of the picture-arranging routine of FIG. 14.

FIG. 19 shows a flowchart for the subroutine SBR5 executed at step S500 of the picture-arranging routine shown in FIG. 14. Of course, the execution of the subroutine SBR5 is started when the clicking operation is performed provided that the second object-transferring button MB2 is indicated by the pointer.

At step S501, it is determined whether the variable "USENUM" is not "0". If USENUM≠0, i.e. if any one of the objects, displayed on the picture-arranging-display area GDA, is indicated by clicking on it with the mouse, the control proceeds to step S502, in which it is determined whether the variable "UNUSENUM" is not "0". If UNUSENUM≠0, i.e. if any one of the objects, displayed on the picture-shunting-display area TMPA, is indicated by clicking on it with the mouse, the control proceeds to step S503, in which an object number corresponding to the variable "UNUSENUM" is eliminated from the UNUSE-list memory-area. Then, at step S504, the eliminated object-number is added to the USE-list memory-area so as to be wedged in the list-position of the USE-list memory-area, at which the object-number corresponding to the "USENUM" is listed, resulting in a return of the object concerned from the display area TMPA to the display area GDA.

At step S505, the second and third object-transferring buttons MB2 and MB3 are disabled if the UNUSE-list memory-area is emptied due to the transfer or return of the object concerned from the display area TMPA to the display area GDA. Of course, if at least one object-number is still listed in the UNUSE-list memory-area, i.e. if at least one object is displayed on the display area TMPA, the buttons MB2 and MB3 remain enabled.

At step S506, the variable "USENUM" is set to be the object-number added to the UNUSE-list memory-area, and the variable "USENUM" is reset to be "0".

At step S501, if USENUM=0, i.e. if none of the objects, displayed on the picture-arranging-display area GDA, is indicated by clicking on it with the mouse, the subroutine SBR5 once ends. Namely, when no indication of object is performed on the display area GDA, the operation of the second object-transferring button MB2 is ignored.

Similarly, at step S502, is UNUSENUM=0, i.e. if none of the objects, displayed on the picture-shunting-display area TMPA, is indicated by clicking on it with the mouse, the subroutine SBR5 once ends. Namely, when no indication of object is performed on the display area TMPA, the operation of the second object-transferring button MB2 is ignored.

Figure 20:
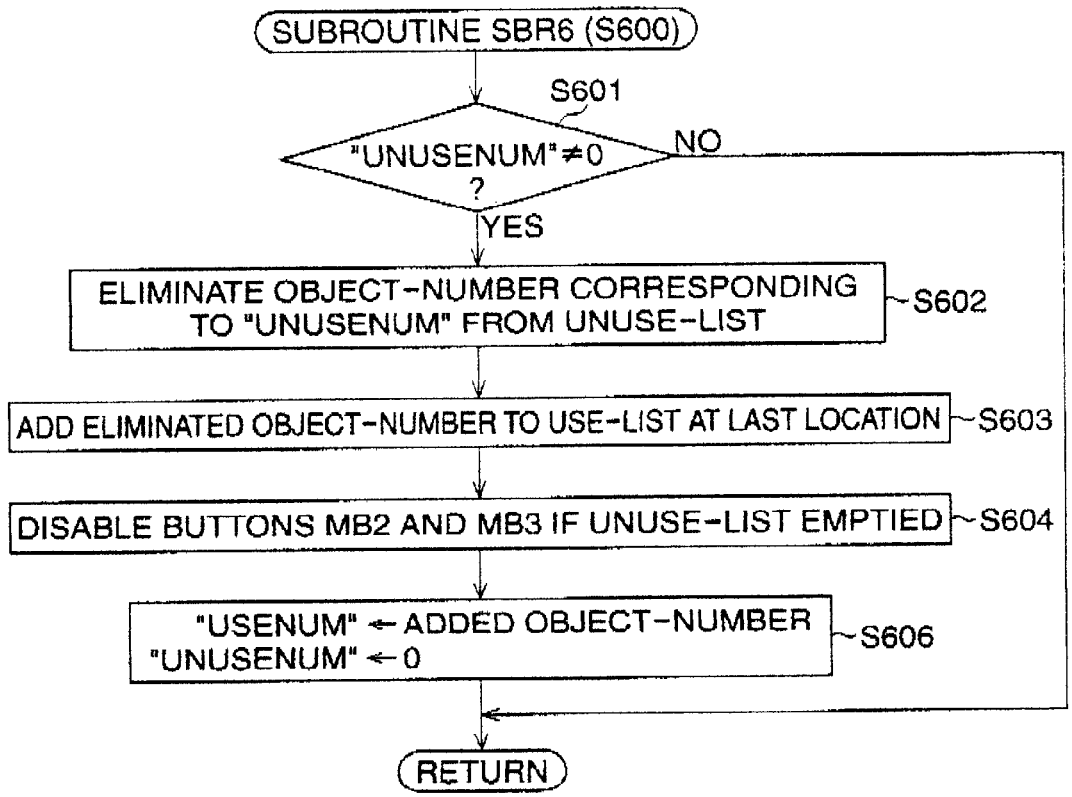
FIG. 20 is a flowchart for a subroutine executed in step S600 of the picture-arranging routine of FIG. 14.

FIG. 20 shows a flowchart for the subroutine SBR6 executed at step S600 of the picture-arranging routine shown in FIG. 14. Of course, the execution of the subroutine SBR6 is started when the clicking operation is performed provided that the third object-transferring button MB3 is indicated by the pointer.

At step S601, it is determined whether the variable "UNUSENUM" is not "0". If UNUSENUM≠0, i.e. if any one of the objects, displayed on the picture-shunting-display area TMPA, is indicated by clicking on it with the mouse, the control proceeds to step S602, in which an object number corresponding to the variable "UNUSENUM" is eliminated from the UNUSE-list memory-area. Then, at step S603, the eliminated object-number is added to the USE-list memory-area so as to be listed at a last list-position thereof, resulting in a return of the object concerned from the display area TMPA to the display area GDA.

At step S604, the second and third object-transferring buttons MB2 and MB3 are disabled if the UNUSE-list memory-area is emptied due to the transfer or return of the object concerned from the display area TMPA to the display area GDA. Of course, if at least one object-number is still listed in the UNUSE-list memory-area, i.e. if at least one object is displayed on the display area TMPA, the button MB2 and MB3 remain enabled.

At step S605, the variable "USENUM" is set to be the object-number added to the UNUSE-list memory-area, and the variable "USENUM" is reset to be "0".

At step S601, if UNUSENUM=0, i.e. if none of the objects, displayed on the picture-shunting-display area TMPA, is indicated by clicking on it with the mouse, the subroutine SBR6 once ends. Namely, when no indication of object is performed on the display area TMPA, the operation of the third object-transferring button MB3 is ignored.

Figure 21:
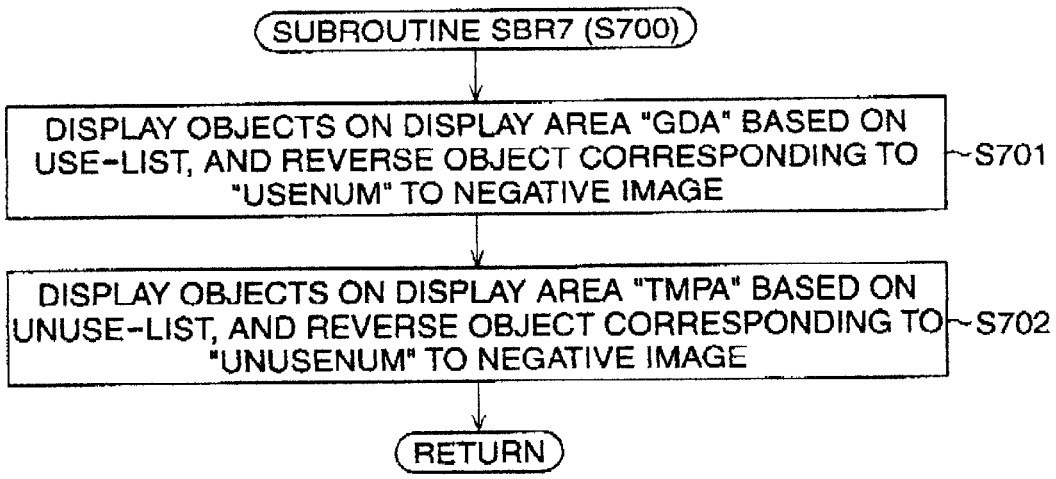
FIG. 21 is a flowchart for a subroutine executed in step S700 of the picture-arranging routine of FIG. 14.

FIG. 21 shows a flowchart for the subroutine SBR7 executed at step S700 of the picture-arranging routine shown in FIG. 14. Of course, the execution of the subroutine SBR7 is started after one of the subroutines SBR2, SBR3, SBR4, SBR5 and SBR6 is executed.

At step S701, the display of objects on the picture-arranging-display area GDA is performed in accordance with the object-numbers listed in the USE-list memory-area, and an object corresponding to the variable "USENUM" is reversed to a negative image object. Of course, if USENUM=0, there is no object to be reversed to a negative image object.

At step S702, the display of objects on the picture-shunting-display area TMPA is performed in accordance with the object-numbers listed in the UNUSE-list memory-area, and an object corresponding to the variable "UNUSENUM" is reversed to a negative image object. Of course, if UNUSENUM=0, there is no object to be reversed to a negative image object.

As is apparent from the foregoing, when the execution of the picture-arranging routine (FIG. 14) is completed, the fixed pairs of pictures are stored in the working memory 19, and a survey map section is produced based on each fixed pair of pictures.

Figure 22:
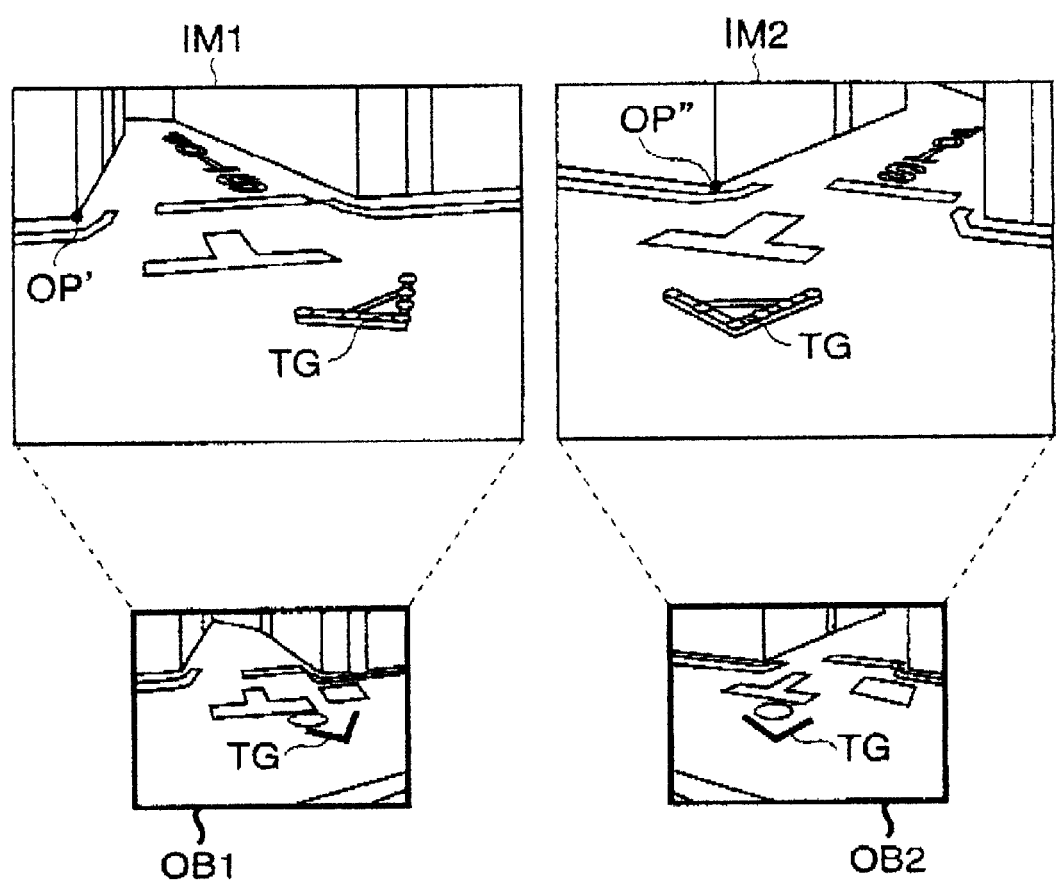
FIG. 22 is a conceptual illustration for explaining a production of a survey map based on a fixed pair of pictures.

For example, as shown in FIG. 22, a first survey map section is produced based on the first pair of pictures IM1 and IM2 corresponding to the first pair of objects OB1 and OB2. Of course, the pictures IM1 and IM2 are displayed on the monitor 10, and the first scene coordinate system ($X_S$-$Y_S$-$Z_S$) is already determined as explained with reference to FIGS. 4, 5 and 6. When respective points OP' and OP", corresponding to each other on the pictures IM1 and IM2, are indicated by clicking on it with the mouse, three-dimensional coordinates of an object point, represented by the indicated points OP' and OP", are calculated and determined with respect to the first scene coordinate system ($X_S$-$Y_S$-$Z_S$). Then, the determined coordinates of the object point is projected on the plane defined by the X-and Z-axes of the first scene coordinate system ($X_S$-$Y_S$-$Z_S$). Thus, by indicating various pairs of corresponding points on the pictures IM1 and IM2, the survey map section is drawn on the plane defined by the X-and Z-axes of the first scene coordinate system ($X_S$-$Y_S$-$Z_S$).

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 11-191839 (filed on Jul. 6, 1999), which is expressly incorporated herein, by reference, in its entirety.

What is claimed is:

1. An image processing computer system for a photogrammetric analytical measurement in which a survey map is formed by successively connecting survey map sections to each other, each of said survey map sections being produced based on a set of pictures photographed for said measurement, said system comprising:

a memory that stores plural frames of image data associated with each said set of pictures, each picture of said set of pictures forming a survey map section is taken from a different photographing direction, each picture of said set of pictures including a target at a predetermined position in the image defining the image data;

an image-data-reading controller that reads the plural frames of image data from said memory in a predetermined order;

a monitor that displays a scene including a picture-arranging-display area and a picture-shunting-display area;

a first monitor controller that displays respective plural pictures on said picture-arranging-display area on the basis of said plural frames of image and data read from said memory by said image-data-reading controller;

a second monitor controller that transfers a displayed picture from said picture-arranging-display area to said picture-shunting-display area; and a third monitor controller that returns the transferred picture to said picture-arranging-display area, wherein the pictures displayed on said picture-arranging-display area are rearranged using said second and third monitor controllers such that pictures forming each said set of pictures for producing a survey map section are capable of being visually recognized, each picture of said set of pictures forming the survey map section being taken from a different photographing position and including the target at a predetermined position in the image defining the image data.

2. An image processing computer as set forth in claim 1, wherein a display of pictures on said picture-arranging-display area and said picture-shunting display area is performed at a reduced size.

3. An image processing computer as set forth in claim 1, wherein the plural pictures are displayed on said picture-arranging-display area to form a pair of columns under control of said first monitor controller, and said pictures forming each set for producing the survey map section are displayed side by side in said pair of columns after the rearrangement of pictures by said second and third monitor controllers.

4. An image processing computer as set forth in claim 1, wherein said second monitor controller is provided for transferring a picture, having no relation to said measurement, from said picture-arranging-display area to said picture-shunting-display area.

5. An image processing computer as set forth in claim 4, further comprising:

an indicator that indicates a picture to be transferred from said picture-arranging-display area to said picture-shunting display area; and a display controller that reverses the indicated picture to a negative picture.

6. An image processing computer as set forth in claim 1, wherein said third monitor controller is provided for returning the transferred picture to said picture-arranging-display at a given location thereof.

7. An image processing computer as set forth in claim 6, further comprising:

a first indicator that indicates a picture to be returned from said picture-shunting-display area to said picture-arranging-display area;

a first display controller that reverses the picture, indicated by said first indicator, to a negative picture;

a second indicator that indicates a picture on said picture-arranging-display area, a location of which the picture indicated by said first indicator is to be returned to; and a second display controller that reverses the picture, indicated by said second indicator, to a negative picture.

8. An image processing computer as set forth in claim 1, wherein said third monitor controller is provided for returning the transferred picture to said picture-arranging-display at a last location thereof.

9. An image processing computer as set forth in claim 8, further comprising:

an indicator that indicates a picture to be returned from said picture-shunting-display area to said picture-arranging-display area at the last location thereof; and a display controller that reverses the picture, indicated by said indicator, to a negative picture.

10. An image processing method for a photogrammetric analytical measurement in which a survey map is formed by successively connecting survey map sections to each other, each of said survey map sections being produced based on a set of pictures photographed for said measurement, said method comprising:

storing plural frames of image data in a memory, the plural frames of image data associated with each said set of pictures, each picture of said set of pictures forming a survey map section is taken from a different photographing direction, each picture of said set of pictures including a target at a predetermined position in the image defining the image data;

reading the plural frames of image data from said memory in a predetermined order under control of an image-data-reading controller;

displaying a scene on a monitor including a picture-arranging-display area and a picture-shunting-display area;

displaying respective plural pictures on said picture-arranging-display area on the basis of said plural frames of image data, read from said memory by said image-data-reading controller, under control of a first monitor controller;

transferring a displayed picture from said picture-arranging-display area to said picture-shunting-display area under control of a second monitor controller; and returning the transferred picture to said picture-arranging-display area under control of a third monitor controller, wherein the pictures displayed on said picture-arranging-display area are rearranged using said second and third monitor controllers such that pictures forming each said set of pictures for producing a survey map section are capable of being visually recognized, each picture of said set of pictures forming the survey map section being taken from a different photographing position and including the target at a predetermined position in the image defining the image data.

11. A memory medium storing an image processing program for a photogrammetric analytical measurement in which a survey map is formed by successively connecting survey map sections to each other, each of said survey map sections being produced based on a set of pictures photographed for said measurement, said program comprising:

storing plural frames of image data in a memory, the plural frames of image data associated with each said set of pictures, each picture of said set of pictures forming a survey map section is taken from a different photographing direction, each picture of said set of pictures including a target at a predetermined position in the image defining the image data;

reading the plural frames of image data from said memory in a predetermined order under control of an image-data-reading controller;

displaying a scene on a monitor including a picture-arranging-display area and a picture-shunting-display area;

displaying respective plural pictures on said picture-arranging-display area on the basis of said plural frames of image data, read from said memory by said image-data-reading controller, under control of a first monitor controller;

transferring a displayed picture from said picture-arranging-display area to said picture-shunting-display area under control of a second monitor controller; and returning the transferred picture to said picture-arranging-display area under control of a third monitor controller, wherein the pictures displayed on said picture-arranging-display area are rearranged using said second and third monitor controllers such that pictures forming each said set of pictures for producing a survey map section are capable of being visually recognized, each picture of said set of pictures form the survey map section being taken from a different photographing position and including the target at a predetermined position in the image defining the image data.

* * * * *